US008543625B2

(12) United States Patent
Middleton et al.

(10) Patent No.: US 8,543,625 B2

(45) Date of Patent: Sep. 24, 2013

(54) METHODS AND SYSTEMS FOR ANALYSIS OF MULTI-SAMPLE, TWO-DIMENSIONAL DATA

(75) Inventors: Nicholas L. Middleton, Cartersville, GA (US); Bryan G. Donaldson, Cummings, GA (US); Robert L. Bass, II, Decatur, GA (US); Anamika Saxena, Alpharetta, GA (US)

(73) Assignee: Intelliscience Corporation, Atlanta, GA (US)

( * ) Notice: Subject to any disclaimer, the term of this patent is extended or adjusted under 35 U.S.C. 154(b) by 1013 days.

(21) Appl. No.: 12/580,967

(22) Filed: Oct. 16, 2009

(65) Prior Publication Data

US 2010/0100577 A1 Apr. 22, 2010

Related U.S. Application Data

(60) Provisional application No. 61/106,091, filed on Oct. 16, 2008.

(51) Int. Cl.
*G06F 7/00* (2006.01)
*G06F 17/15* (2006.01)

(52) U.S. Cl.
USPC .......... 708/200; 708/424

(58) Field of Classification Search
USPC .......... 708/200, 442
See application file for complete search history.

(56) References Cited

U.S. PATENT DOCUMENTS

| | | | | | |
|---|---|---|---|---|---|
| 6,057,885 | A * | 5/2000 | Horishi et al. | ........ | 348/450 |
| 6,147,344 | A | 11/2000 | Annis et al. | | |
| 6,449,584 | B1 | 9/2002 | Bertrand et al. | | |
| 6,642,059 | B2 | 11/2003 | Chait et al. | | |
| 6,721,462 | B2 * | 4/2004 | Okabayashi et al. | ........ | 382/278 |
| 6,841,403 | B2 * | 1/2005 | Tanaka et al. | ........ | 438/14 |
| 6,925,389 | B2 | 8/2005 | Hitt et al. | | |
| 7,087,896 | B2 | 8/2006 | Becker et al. | | |
| 7,242,988 | B1 * | 7/2007 | Hoffberg et al. | ........ | 700/28 |
| 2007/0195612 | A1 * | 8/2007 | Brinson et al. | ........ | 365/189.01 |

* cited by examiner

*Primary Examiner* — Chuong D Ngo
(74) *Attorney, Agent, or Firm* — Lowe Graham Jones PLLC

(57) ABSTRACT

The present invention utilizes a pattern extraction methodology to elucidate significant patterns and mathematical relationships that exist between and among pluralities of two-dimensional sample data sets of the same data type. In one instance, the present invention analyzes multi-sample, two-dimensional mass spectroscopy data, while in an alternate instance, another user-specified, preset, or automatically determined data type, modality, submodality, etc., is analyzed.

6 Claims, 37 Drawing Sheets

| | *m/z* A | *m/z* B | *m/z* C | *m/z* D | *m/z* E | *m/z* F |
|---|---|---|---|---|---|---|
| Data set 1 | 14 | 4 | 8 | 6 | 5 | 2 |
| Data set 2 | 2 | 4 | 3 | 6 | 4 | 4 |
| Data set 3 | 7 | 9 | 2 | 11 | 1 | 0 |

*FIG. 7*

| | *m/z* A | *m/z* B | *m/z* C | *m/z* D | *m/z* E | *m/z* F |
|---|---|---|---|---|---|---|
| Data set 1 | 0 | -10 | -6 | -8 | -9 | -12 |
| Data set 2 | 0 | 2 | 1 | 4 | 2 | 2 |
| Data set 3 | 0 | 2 | 0 | 4 | -1 | -2 |

*FIG. 8*

| | *m/z* G | *m/z* H | *m/z* I | *m/z* J | *m/z* K | *m/z* L |
|---|---|---|---|---|---|---|
| Data set 4 | 3 | 3 | 6 | 18 | 3 | 42 |
| Data set 5 | 6 | 6 | 8 | 24 | 4 | 84 |

*FIG. 10*

| | *m/z* G | *m/z* H | *m/z* I | *m/z* J | *m/z* K | *m/z* L |
|---|---|---|---|---|---|---|
| Data set 4 | 1 | 1 | 2 | 6 | 1 | 14 |
| Data set 5 | 1 | 1 | 1.33 | 4 | 0.67 | 14 |

*FIG. 11*

METHODS AND SYSTEMS FOR ANALYSIS OF MULTI-SAMPLE, TWO-DIMENSIONAL DATA

PRIORITY CLAIM

This application claims the benefit of provisional application Ser. No. 61/106,091, filed Oct. 16, 2008.

FIELD OF THE INVENTION

The present invention relates generally to the field of data analysis and more specifically to a method for identifying patterns between and among pluralities of two-dimensional data sets of the same data type.

BACKGROUND OF THE INVENTION

The collection of data from pluralities of two-dimensional sample data sets of the same data type, modality, submodality, etc., generates rich repositories of information. Such is the case with regard to the data obtained from mass spectroscopy, which is an analytical technique for the resolution of the chemical composition of a subject compound or molecular sample based upon the mass to charge (m/Z) ratio of the component particles. Briefly, a chemical or biological sample is fragmented into charged particles, or ions, by an ion source, and the resultant ions are passed through an electric and magnetic field where they are sorted by their respective atomic masses. A detector then measures the value of an indicator quantity of the ions in the given fragmented sample, and this value is used to calculate the relative abundances of each ion fragment present in the given sample. The product of this chemical analysis is a mass spectrum having peaks (i.e., signals, points, loci, intersections, vertices) of data that can be presented as a graphical plot of m/Z (i.e., X-values in a two-dimensional coordinate plane system) to intensity or abundance values (i.e., Y-values in a two-dimensional coordinate plane) of the component fragments or ions.

Historically, the amount of time and energy (in the form of both human and machine hours) required to sift through the volumes of mass spectroscopy information, decipher and extract the important or relevant peaks, normalize or align peaks from across multiple samples, compare said peaks in an effort to elucidate commonalities or differences between and among the samples, and eventually formulate conclusions about or hypotheses from said data was cost-prohibitive. However, there have been many advances in data pre-processing techniques that have made the former dilemmas much more manageable.

U.S. Pat. No. 6,147,344 by Annis, et al., teaches a method for peak identification in which detection errors are reduced through the elimination of, inter alia, background noise, system resolution inaccuracies, sample contamination, multiply charged ions, and isotope substitutions, all of which commonly plague mass spectroscopy data sets. The method as described therein generates two groups of output values resulting from the performance of the same operation on a control sample and a test sample. The first m/Z value for a material or compound that is expected to be present in the mixture (as obtained from a previously established library of output spectra) is selected, and the difference between the value of the control sample at this expected output value and the value of the test sample at the same is calculated. This difference is compared to a formerly determined value, and a resultant difference that is greater than the predetermined value indicates that the peak, or signal, in question exists above the background noise level. This operation can be repeated multiple times in an effort to eliminate random noise and background contamination and can be further enhanced to delimit peaks resulting from proper retention time in accordance with the separation method used, those from multiply charged ions, and those related to atomic isotopic substitution.

U.S. Pat. No. 6,449,584 by Bertrand, et al., describes a method for peak extraction wherein intensity values of a measurement signal, which can be characterized by a series of peaks mixed with substantially regular background noise, are processed as a function of a discrete variable (e.g., time) in an effort to detect said peaks through noise attenuation. The method comprises the formation of an intensity histogram vector, which represents a frequency distribution from the intensity values of a measurement signal; the zeroing of a portion of the data corresponding to the intensity values below an intensity threshold value derived from shape characteristics of the distribution; and the subtraction of the intensity threshold value from the remaining portion(s) of the data to obtain processed data representing the measurement signal in which each peak exhibits an enhanced signal-to-noise ratio.

U.S. Pat. No. 7,087,896 by Becker, et al., teaches a method for spectra normalization to yield peak intensity values that accurately reflect concentrations of the responsible species. The method first calculates a normalization factor from peak intensities of those inherent components whose concentration remains constant across a series of samples. Relative concentrations of a component occurring in different samples can be estimated from the normalized peak intensities.

U.S. Pat. No. 6,642,059 by Chait, et al., prefers a method for accurately comparing the levels of components present in different samples that comprises culturing a first sample in a first medium and a second sample of the same matter in a second medium, wherein at least one isotope in the second medium has a different abundance than the abundance of the same isotope in the first medium; modulating one sample by treatment with a bacteria, virus, etc; combining said samples and removing at least one component; subjecting the removed component to mass spectroscopy to yield a mass spectrum; and computing a ratio between the peak intensities of at least one closely spaced pair of peaks to determine the relative abundance of the component in each sample.

U.S. Pat. No. 6,925,389 by Hitt, et al., teaches a method for peak classification that uses pattern discovery methods and algorithms to detect subtle patterns in the expression of certain molecules in potentially diagnostic, biological samples. The pattern, which is made up of an optimal set of features (i.e., peaks in mass spectroscopy data), can be defined as a vector of three or more values, obtained from a subset of the data stream or from the total data stream, whose position in an N-dimensional space is discriminatory. This method couples a genetic algorithm directly to an adaptive pattern recognition algorithm to derive the optimal feature set characterizing a given biological state or data stream; first, a vector, which is characteristic of the given data stream, is calculated; and this is followed by determination of which, if any, known data clusters (which are previously determined) the vector rests.

While each of the aforementioned works demonstrate clear advances in peak identification, extraction, normalization, and classification within multi-sample, two-dimensional data, the latter dilemmas of illuminating patterns between and among the pluralities of sample data sets and subsequently deriving accurate conclusions as to what these patterns may indicate are not so thoroughly managed or resolved.

SUMMARY OF THE INVENTION

Accordingly, the present invention as described herein utilizes a pattern extraction methodology to elucidate significant patterns and mathematical relationships that exist between and among pluralities of two-dimensional sample data sets of the same data type. In one instance, the present invention analyzes multi-sample, two-dimensional mass spectroscopy data, while in an alternate instance, another user-specified, preset, or automatically determined data type, modality, submodality, etc., is analyzed.

Moreover, the present invention functions to derive and extract the relationships existent between the peaks (hereafter "loci") sourced from pluralities of sample mass spectra as obtained from different locations within the same biological sample. In yet other aspects of the invention, the system includes an application for data analysis of multi-sample, two-dimensional data.

In other aspects of the present invention, the system provides an automated functionality that operates on the full resolution of the native data. The results are produced in a timely manner thereby alleviating the tedium of preliminary human analysis; the results can also function to alert the operator or trained technician to examine a data set(s) requiring attention.

BRIEF DESCRIPTION OF THE DRAWINGS

The preferred and alternative embodiments of the present invention are described in detail below with reference to the following drawings:

FIG. 7 shows a data table of three original sample data sets with loci X-values as the column headers and the corresponding loci Y-values as the table entries; a simplistic arithmetic pattern is highlighted;

FIG. 8 shows the actual arithmetic relationship between the loci X-values;

FIG. 10 shows a data table of two original sample data sets with loci X-values as the column headers and the corresponding loci Y-values as the table entries; a simplistic geometric pattern is highlighted;

FIG. 11 shows the actual geometric relationship between the loci X-values;

DETAILED DESCRIPTION OF THE PREFERRED EMBODIMENT

Figure 1:
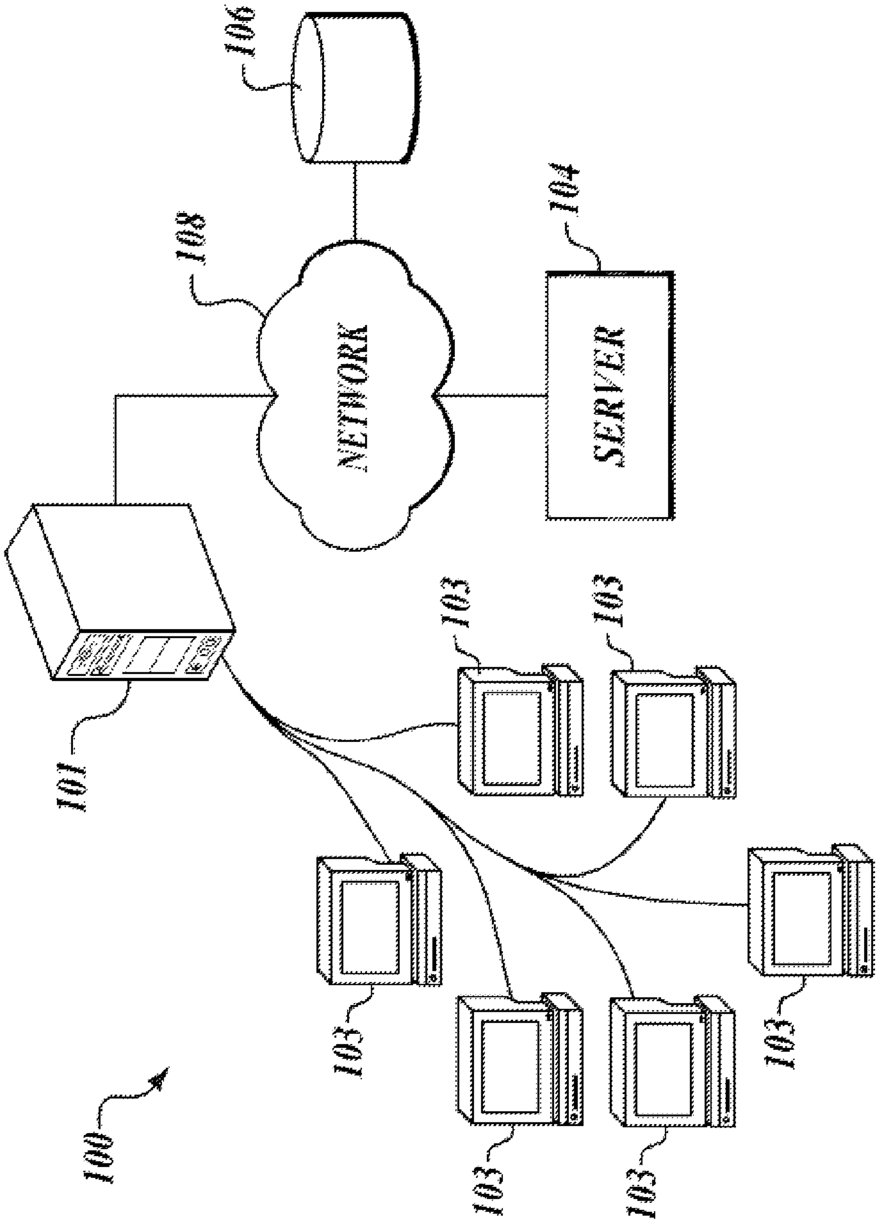
FIG. 1 shows one embodiment of an example data analysis system that is employed in the analysis of two-dimensional data sets.

The methods and systems of the data analysis embodiments and examples as described herein can be used to recognize patterns in one or pluralities of data sets. In a preferred embodiment of the present invention, the data analysis system uses a pattern extraction methodology to elucidate the primary or more fundamental patterns and mathematical relationships between and among pluralities of two-dimensional sample data sets of the same data type and modality. In one instance, this method includes importing pluralities of two-dimensional sample data sets; analyzing the imported data sets for patterns; and saving the results using any acceptable method common in the art. Each two-dimensional sample data set includes pluralities of loci (i.e., peaks in the case of mass spectroscopy data), and each locus is characterized by an X-value and corresponding Y-value. Upon importation, only those loci with Y-values that satisfy the Y-value threshold value are added to a list of all loci; all others are rejected. This list of loci for all sample data sets is then "adjusted," based upon the X-value tolerance values, such that loci lying within a certain distance from one another, and which are not individually significant, are grouped together in a "range." This adjusted list of loci then replaces the original list of loci for pattern elucidation. Mathematical (e.g., binary, arithmetic, geometric, etc.) patterns or relationships between and among the sample data sets are found by first normalizing the loci Y-values across sample data sets and then comparing the loci of each sample data set with the loci of every other sample data set.

The embodiments of a data analysis system described herein generally involve the analysis and organization of digital data streams for the purpose of learning and repeatedly recognizing patterns and features within data. The digital data streams can be conversions of an analog source to digital format.

Although several of the data analysis system embodiments and examples as discussed herein are described with reference to specific data types, modalities, submodalities, etc., such as mass spectroscopy data sets, the present invention is not limited in scope or breadth to analysis of these data types. The methods and systems as described herein can be used to analyze any data set or other collection of information that can be represented in a quantifiable datastore.

As used herein, the term "domain" refers to a problem area of data that is being analyzed for patterns. Lung cancer and renal cell carcinoma are examples of domains in Mass Spectrometry.

As used herein, the term "sub-domain" refers to a subdivision of a domain. In one example, unknown sample data sets or patterns can be identified as the sub-domains adenocarcinoma and squamous cell carcinoma of the domain lung cancer using an embodiment of the present invention.

As used herein, the term "dictionary" refers to the provision of mapping from a set of keys to a set of entries. Each addition to a dictionary consists of a unique key and its associated entry.

As used herein, the term "list" refers to an ordered collection of objects addressed by ordinal positions in the list.

As used herein, the term "locus" refers to a point defined by an X-value and a corresponding Y-value on a two-dimensional coordinate plane.

As used herein, the term "pattern" refers to a specific relationship at a certain locus X-value. It has properties including a list of loci X-values and corresponding loci Y-value relationships and a loci Y-value tolerance value and is dependent upon the pattern type (e.g., arithmetic or linear, geometric, exponential, trigonometric) being identified during the current process. One example of an arithmetic pattern includes a list of loci X-values (i.e., 100.1; 400; 600.2) and a list of the arithmetic relationships between them (i.e., 0; 50; 102). The locus Y-value at 400 is 50 more than the locus Y-value at 100.1, and the locus Y-value at 600.2 is 102 more than the locus Y-value at 100.1.

As used herein, the term "range (object)" refers to a group of close-valued loci X-values defined by a "low" value and a "high" value. A range also has an associated "range name" or label by which it can be referred; the original loci X-values that are to be replaced if the loci X-values are to be adjusted for the user-specified, preset, or automatically determined loci X-value tolerances; and information regarding the specific loci X-values contained therein and the sample data sets from which the loci X-values derive. In one instance, a range is used when it may not be desirable to search for an exact match of loci X-values while attempting to identify patterns between sample data sets.

As used herein, the term "un-normalized" (data) refers to the raw sample data sets that have yet to be "normalized" by an embodiment of the present invention.

As used herein, the term "normalized" data refers to data that has been processed by an embodiment of the present invention so as to permit the elucidation of patterns between and among the loci of pluralities of sample data sets by said system.

FIG. 1 shows an example system 100 for executing a data analysis system. In one embodiment, the system 100 includes a single computer 101. In an alternate embodiment, the system 100 includes a computer 101 in communication with pluralities of other computers 103. In an alternate embodiment, the computer 101 is connected with pluralities of other computers 103, a server 104, a datastore 106, and/or a network 108, such as an intranet or the Internet. In yet another embodiment, a bank of servers, a wireless device, a cellular telephone, and/or another data capture/entry device(s) can be used in place of the computer 101. In one embodiment, a data storage device 106 stores a data analysis datastore. The datastore 106 can be stored locally at the computer 101 or at any remote location while remaining retrievable by the computer 101. In one embodiment, an application program, which creates the datastore 106, is run by the server 104 or by the computer 101. Also, the computer 101 or server 104 can include an application program(s) that identifies a pattern in one or between or among pluralities of digital data streams. In one embodiment, the media is one or pluralities of mass spectra or one or more samples of financial data.

Figure 2:
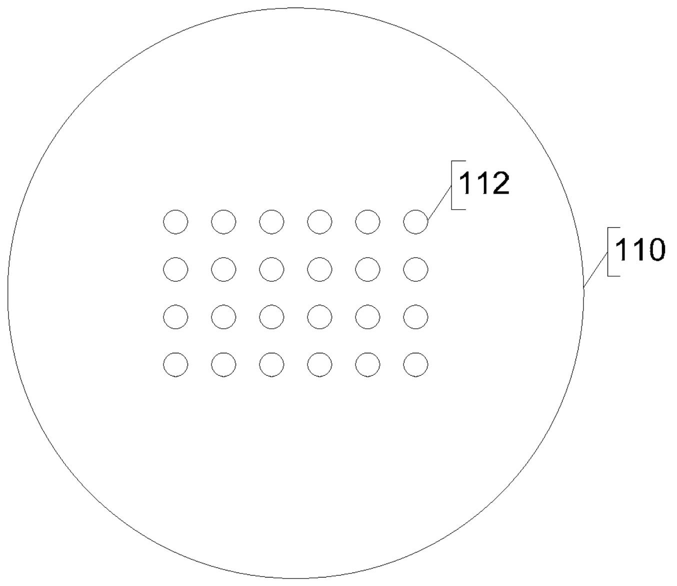
FIG. 2 shows an example mass spectroscopy sample data set.

FIG. 2 shows an example sample data set. In mass spectroscopy, for example, a tissue sample 110 (e.g., cancerous or non-cancerous tissue; drug-treated or untreated tissue) is analyzed via mass spectroscopy at pluralities of locations 112. The analysis of each location 112 of the tissue sample 110 results in a single mass spectrum representing the molecular fragments of said sample location 112. The method as described herein functions to determine whether there are any patterns between or among any of the mass spectra resulting from the pluralities of sample locations 112.

Figure 3:
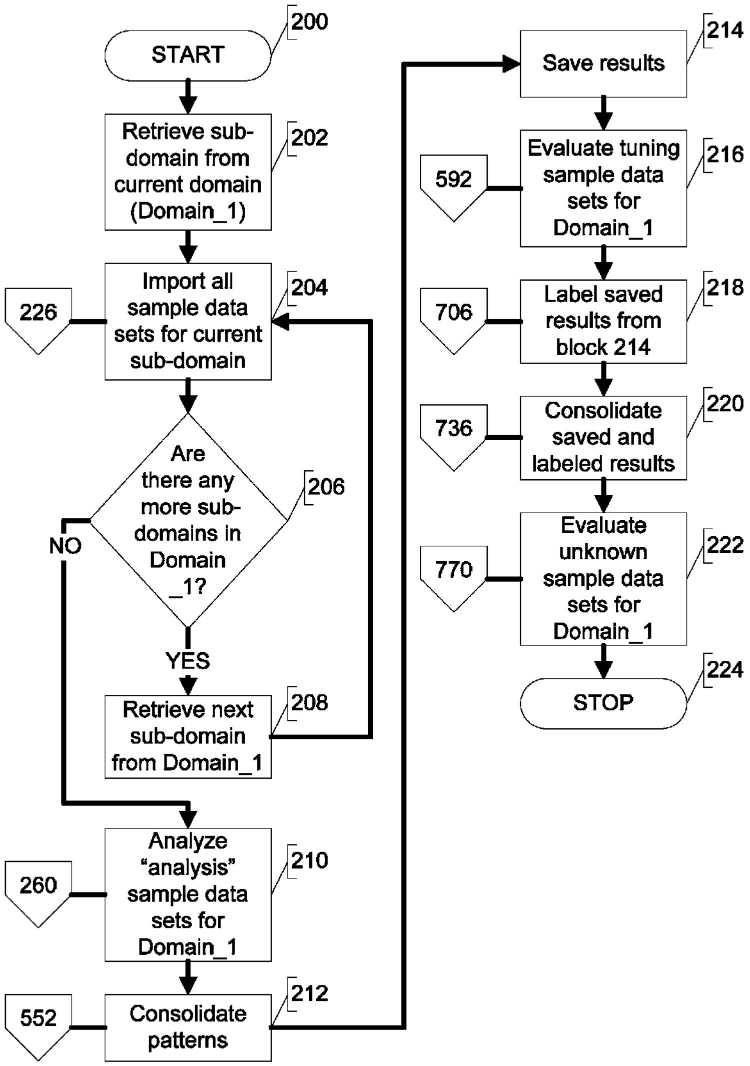
FIG. 3 shows an example method for analyzing and evaluating pluralities of two-dimensional data sets that are each comprised of a series of loci.

FIG. 3 shows one embodiment of an example method 200 for analyzing pluralities of two-dimensional (e.g., mass spectroscopy) data sets that are each comprised of a series of loci where a single locus is a combination of an X-value and a Y-value as is common when using a standard, two-dimensional coordinate plane system. For a sample mass spectroscopy data set (i.e., mass spectrum), each peak is defined by a mass-to-charge (hereafter "m/Z") ratio, which can be generalized to a representative X-value on the coordinate plane, and an intensity or abundance value, which can be generalized to a representative Y-value; the correlative X- and Y-values of a given mass spectrum peak constitute a single locus within the current sample data set. It is the series of loci X-values and corresponding Y-values that are utilized during the elucidation of patterns across pluralities of sample data sets (i.e., mass spectra). For the purposes of this discussion, a pattern is an object with properties including a listing of loci X-values and corresponding Y-value relationships, a loci Y-value tolerance (as determined in FIG. 25), and a pattern type (as determined at block 266 of FIG. 6).

The method 200 of FIG. 3 initializes at block 200, and at block 202 a sub-domain is retrieved from the current domain (hereafter "Domain_1"). At block 204, pluralities of sample data sets for the current sub-domain are imported into an embodiment of the present invention; this is described in more detail in FIGS. 4-5. At block 206, a decision is made as to whether there are any sub-domains remaining in Domain_1. If YES at block 206, at block 208 a next sub-domain is retrieved from Domain_1, and the method 200 returns to block 204. If NO at block 206, at block 210 the sample data sets for Domain_1 are analyzed for the existence of patterns; this is described in more detail in FIGS. 6-26. Here, sample data sets for each sub-domain in a given domain are subdivided into two parts: the first part is used to analyze the data for the existence of patterns; and the second part is used to tune and improve the analysis. Next, one or more unknown sample data sets are evaluated for identification. At block 212, the patterns are consolidated; this is described in more detail in FIGS. 27-28. At block 214, the results are saved using any acceptable method available in the art. At block 216, the tuning sample data sets are evaluated for Domain_1; this is described in more detail in FIGS. 29-33. At block 218, the saved results from block 214 are labeled; this is described in more detail in FIG. 34. At block 220, the saved results from block 214 are consolidated; this is described in more detail in FIGS. 35-36. At block 222, the unknown sample data sets for Domain_1 are evaluated; this is described in more detail in FIG. 37. At block 224, the method 200 is complete.

Figure 4:
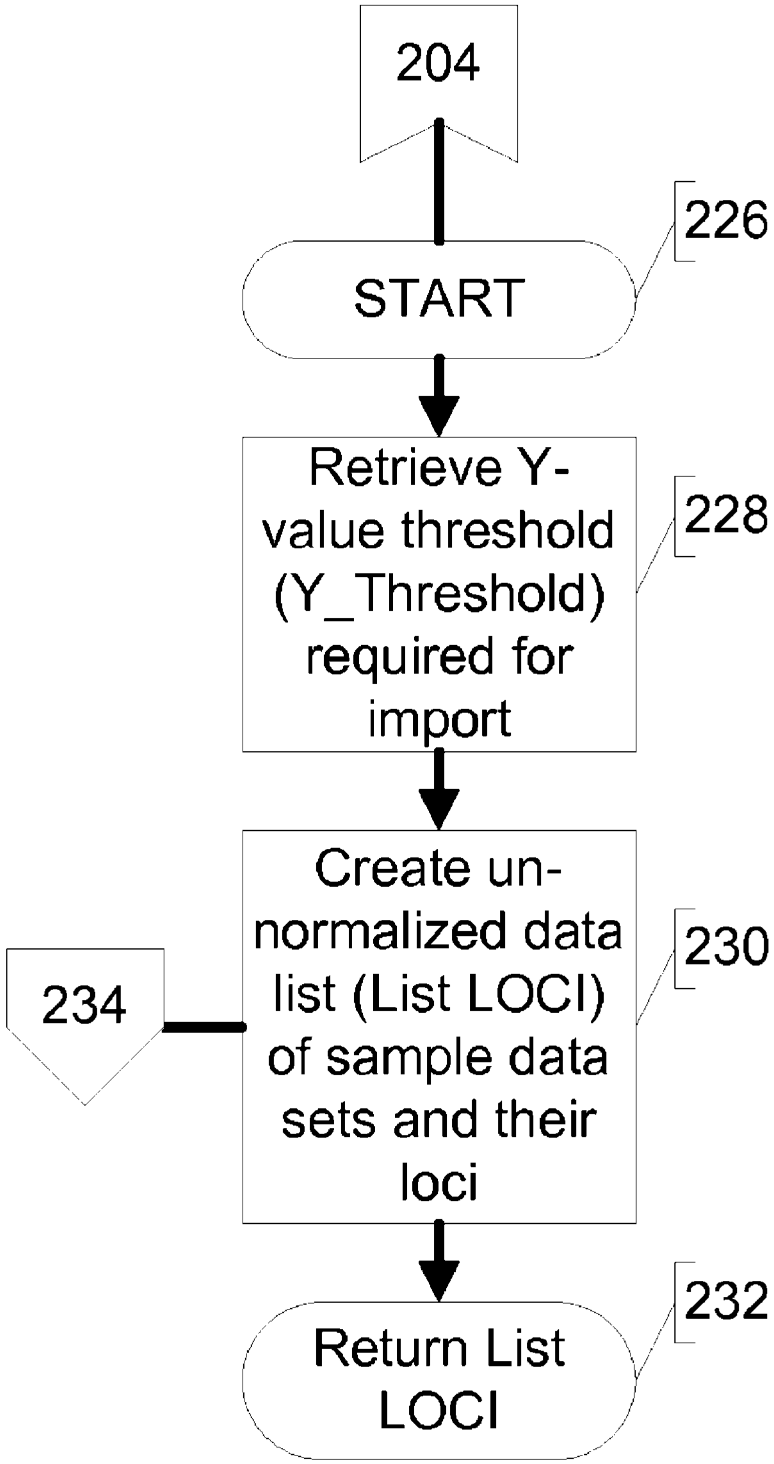
FIG. 4 shows an example method for creating an un-normalized, unadjusted, list of acceptable loci as sourced from the pluralities of available sample data sets.

FIG. 4 shows an example method 204 for creating an un-normalized, "unadjusted," list of the acceptable loci as sourced from the pluralities of available sample data sets. Each sample data set is comprised of loci, but only the loci of a given sample data set with Y-values greater than a user-specified, preset, or automatically determined Y-value threshold of acceptability are imported into a system of the present invention; the others are rejected. The method 204 initializes at block 226, and at block 228 the user-specified, preset, or automatically determined loci Y-value threshold (hereafter "Y_Threshold") is retrieved. At block 230, an un-normalized data list (hereafter "List LOCI"), which is a listing of the pluralities of imported sample data sets and their respective pluralities of loci X-values and corresponding Y-values, is created; this is described in more detail with reference to FIG. 5. At block 232, the completed List LOCI is returned, and the method 204 is complete.

Figure 5:
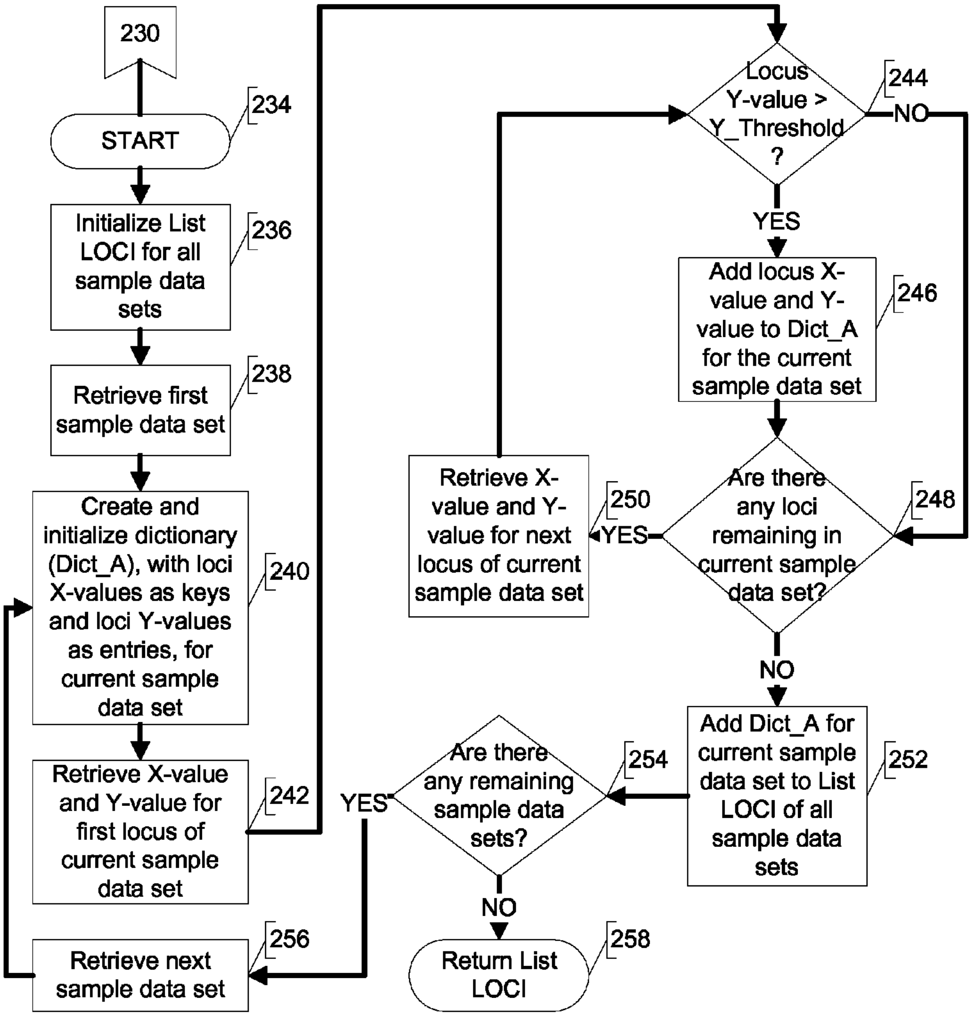
FIG. 5 shows an example method for populating a list for all sample data sets with the pluralities of associated loci that satisfy the loci Y-value threshold value requirement.

FIG. 5 shows an example method 230 for populating List LOCI for all sample data sets with the pluralities of associated loci that satisfy the Y_Threshold value (as determined at block 228 of FIG. 4) requirement. The method 230 initializes at block 234, and at block 236 List LOCI is initialized for all sample data sets. At block 238, the first sample data set slated for import is retrieved. At block 240, a discrete dictionary (hereafter "Dict_A"), with loci X-values as keys and corresponding loci Y-values as entries, is created and initialized for the current sample data set. At block 242, the X-value and correlative Y-value for the first locus of the current sample data set are retrieved. At block 244, a decision is made as to whether the locus Y-value is greater than Y_Threshold. If YES at block 244, at block 246 the locus X-value and correlative Y-value are added to Dict_A for the current sample data set, and the method 230 proceeds to block 248. If NO at block 244, the method 230 proceeds to block 248.

At block 248 of FIG. 5, a decision is made as to whether there are any loci remaining in the current sample data set. If YES at block 248, at block 250 the X-value and correlative Y-value for the next locus of the current sample data set are retrieved, and the method 230 returns to block 244. If NO at block 248, at block 252 Dict_A for the current sample data set is added to List LOCI of all sample data sets. At block 254, a decision is made as to whether there are any sample data sets remaining to be imported. If YES at block 254, at block 256 the next sample data set is retrieved, and the method 230 returns to block 240. If NO at block 254, at block 258 completed List LOCI is returned, and the method 230 is complete.

Figure 6:
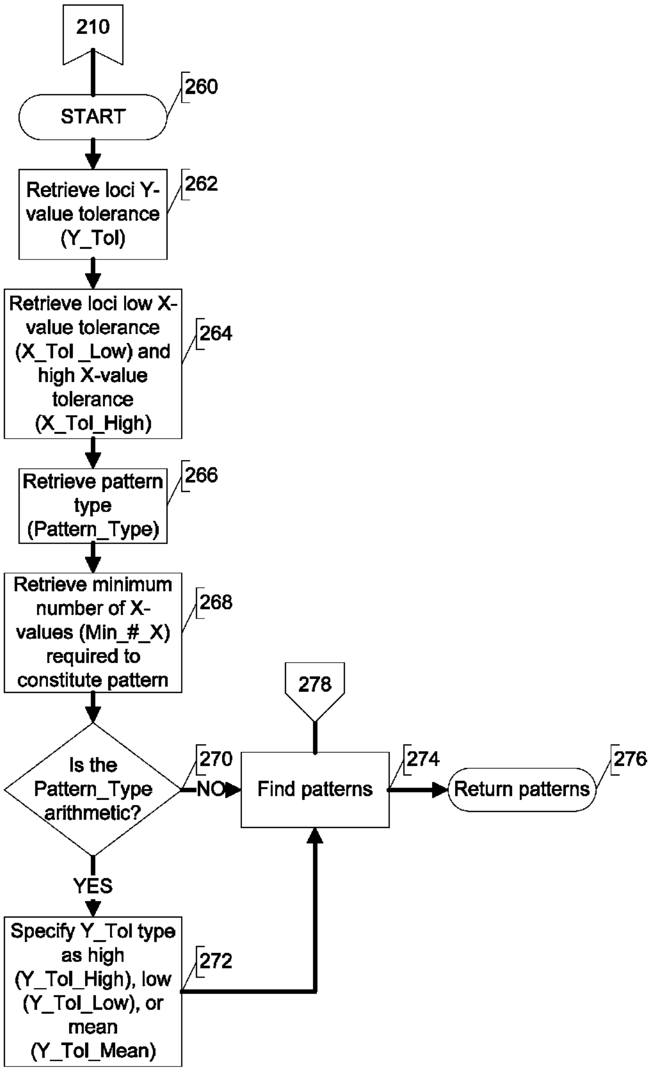
FIG. 6 shows an example method for analyzing the imported sample data sets for patterns; here, pluralities of user-specified, preset, or automatically determined application parameters are configured prior to pattern elucidation.

FIG. 6 shows an example method 210 for analyzing the imported sample data sets of List LOCI for patterns; specifically, pluralities of user-specified, preset, or automatically determined application parameters are configured prior to pattern elucidation. The method 210 initializes at block 260, and at block 262 the loci Y-value tolerance (hereafter "Y_Tol") is retrieved. At block 264, the loci low X-value tolerance (hereafter "X_Tol_Low") and the loci high X-value tolerance (hereafter "X_Tol_High") are retrieved; specifically, the tolerance attributed to the loci X-values is a range of acceptability that varies linearly from the low locus X-value to the high locus X-value of the given range. These aforementioned tolerance values afford some latitude for accepting loci whose X- and/or correlative Y-values are within a certain scope or range of suitability (e.g., a Y_Tol of ten will equate loci Y-values that are within a plus-or-minus ten range of each other) and are useful when patterns between and among sample data sets are difficult to find due to minor discrepancies between the loci X- or Y-values across multiple sample data sets or in instances where the search for an exact pattern match is not always desirable or possible. With regard to mass spectroscopy data sets, peak differences can be caused by, inter alia, the inherent differences of biological samples, the innate shortcomings of the assay technique(s) used to analyze the sample such as consistent instrument calibration or outputs, and/or minute molecular fragmentation differences, for example.

At block 266 of FIG. 6, the pattern type (hereafter "Pattern_Type") to be found between or among the imported sample data sets is retrieved; in one embodiment, pattern types include, inter alia, binary, arithmetic or linear (see FIGS. 7-9), geometric (see FIGS. 10-12), exponential, or trigonometric. In one instance, a binary pattern is characterized by the presence (or absence) of a particular locus in a given sample data set or across pluralities of sample data sets. With regard to mass spectroscopy data sets, the presence of a user-specified, preset, or automatically determined peak(s) across pluralities of sample data sets determines whether or not a pattern exists; alternately, not only the presence of a peak but its presence in combination with correlative intensity value or another peak(s) might also play a role in determining the existence of a binary pattern across sample data sets.

Figure 9:
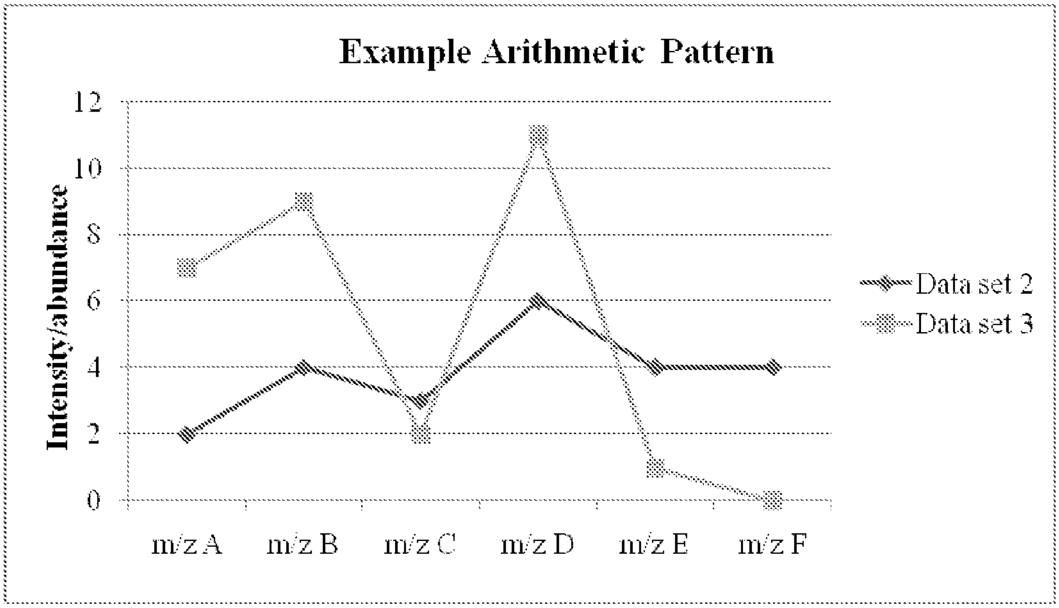
FIG. 9 shows a graphical representation of the arithmetic pattern.

In one instance, an arithmetic pattern, as illustrated using mass spectroscopy data, is shown in FIGS. 7-9. FIG. 7 shows a data table of three original sample data sets (i.e., Data set 1, Data set 2, Data set 3) with the peak m/Z values (i.e., loci X-values) as the column headers and the corresponding peak intensity values (i.e., loci Y-values) as the table entries; a simplistic arithmetic pattern is revealed between peak m/Z values A, B, and D of Data set 2 and Data set 3 as highlighted. FIG. 8 shows the actual arithmetic relationship between peak m/Z values A, B, and D and is elucidated per the following. First, normalization of the first peak intensity value of each data set is performed; for this example, the peak intensity values at peak m/Z A of each sample data set are set to zero. Once normalization is complete, the remaining intensity values for all the peaks of each sample data set are normalized to the associated normalization value. For Data set 1, each of the peak intensity values for peak m/Z values B, C, D, E, and F are subtracted by fourteen (14); for Data set 2, each of the peak intensity values for peak m/Z B, C, D, E, and F are subtracted by two (2); and for Data set 3, each of the peak intensity values for peak m/Z B, C, D, E, and F are subtracted by seven (7). From these calculations, it becomes obvious within Data set 2 and Data set 3 that peaks m/Z A, B, and D share an arithmetic relationship. FIG. 9 shows a graphical representation of the aforementioned arithmetic relationship between peak m/Z values A, B, and D of Data set 2 and Data set 3.

Figure 12:
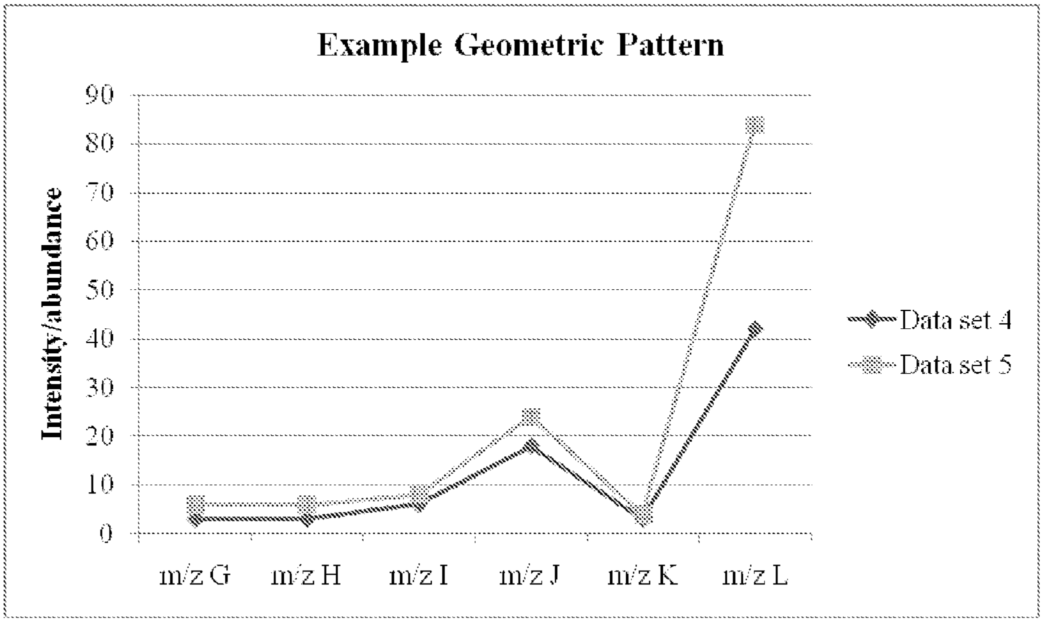
FIG. 12 shows a graphical representation of the geometric pattern.

In one instance, a geometric pattern, as illustrated using mass spectroscopy data, is shown in FIGS. 10-12. FIG. 10 shows a data table of two original sample data sets (i.e., Data set 4, Data set 5) with the peak m/Z values (i.e., loci X-values) as the column headers and the corresponding peak intensity values (i.e., loci Y-values) as the table entries; a simplistic geometric pattern is revealed between peak m/Z values G, H, and L of Data set 4 and Data set 5 as highlighted. FIG. 11 shows the actual geometric relationship between the peak m/Z values G, H, and L; for this example, patterns between the peak m/Z values are found by dividing all the peak m/Z values of the current sample data set by peak m/Z value G of the same sample data set. From these calculations, it becomes obvious within Data set 4 and Data set 5 that the peak m/Z L has an intensity value that is fourteen (14) times greater than peak m/Z G and peak m/Z H. FIG. 12 shows a graphical representation of the aforementioned geometric relationship between peak m/Z values G, H, and L of Data set 4 and Data set 5.

At block 268 of FIG. 6, the user-specified, preset, or automatically determined minimum number of loci X-values (hereafter "Min_#_X") required to constitute a pattern is retrieved. At block 270, a decision is made as to whether the Pattern_Type is set to "arithmetic." If YES at block 270, at block 272 the Y_Tol value is further delimited as high (hereafter "Y_Tol_High"), low (hereafter "Y_Tol_Low"), or mean (hereafter "Y_Tol_Mean"), and the method 210 proceeds to block 274. If NO at block 270, the method 210 proceeds to block 274.

At block 274 of FIG. 6, patterns between and among the imported sample data sets are found; this is described in more detail with reference to FIGS. 13-26. At block 276, the identified patterns are returned, and the method 210 is complete.

Figure 13:
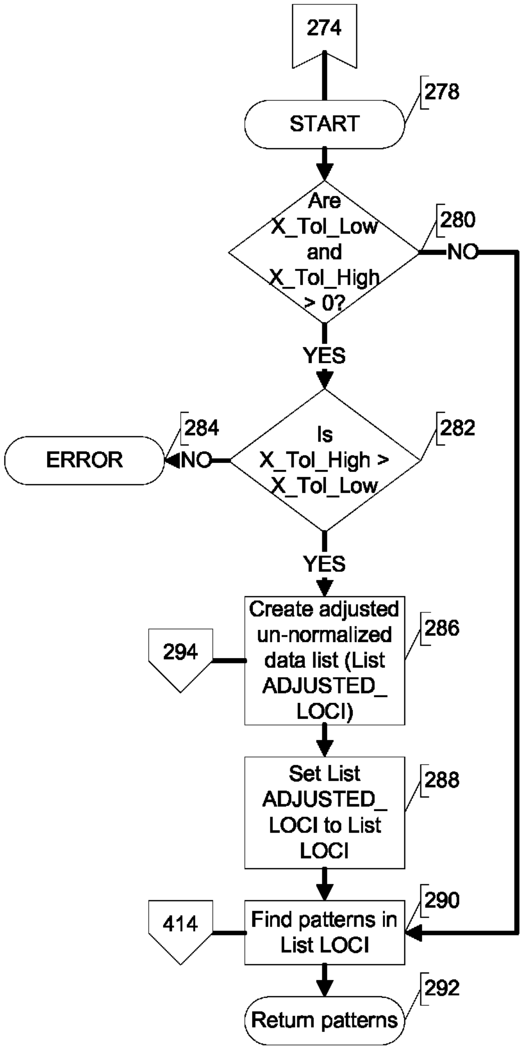
FIG. 13 shows an example method for creating an un-normalized, adjusted list of acceptable loci as sourced from the pluralities of available sample data sets based upon the low and high loci X-value tolerance values.

FIG. 13 shows an example method 274 for creating an un-normalized, "adjusted" list of acceptable loci as sourced from the pluralities of available sample data sets based upon the X_Tol_Low and X_Tol_High values (as determined at block 264 of FIG. 6), if specified. In one instance, the present invention functions to assimilate the pluralities of loci X-values that fall within a specified tolerance of one another into a single representative loci X-value "range." In this way, much of the intrinsic variation between and among the sample data sets and included loci is mitigated so as to allow patterns to be more easily identified. This adjusted list of loci then replaces the unadjusted list of loci during the pattern elucidation process.

The method 274 of FIG. 13 initializes at block 278, and at block 280 a decision is made as to whether the values of X_Tol_Low and X_Tol_High (as determined at block 264 of FIG. 6) are both greater than zero. If YES at block 280, the method 274 proceeds to block 282; if NO at block 280, the method 274 proceeds to block 290. At block 282, a decision is made as to whether the value of X_Tol_High is greater than the value of X_Tol_Low. If YES at block 282, the method 274 proceeds to block 286; if NO at block 282, at block 284 the method 274 returns an ERROR.

At block 286 of FIG. 13, List ADJUSTED_LOCI, which is a listing of the pluralities of imported sample data sets and their respective pluralities of adjusted loci X-values and corresponding loci Y-values, is created; this is described in more detail in FIGS. 14-19. At block 288, List ADJUSTED_LOCI is set to List LOCI. At block 290, patterns are identified within List LOCI; this is described in more detail in FIGS. 20-26. At block 292, the identified patterns are returned, and the method 274 is complete.

Figure 14:
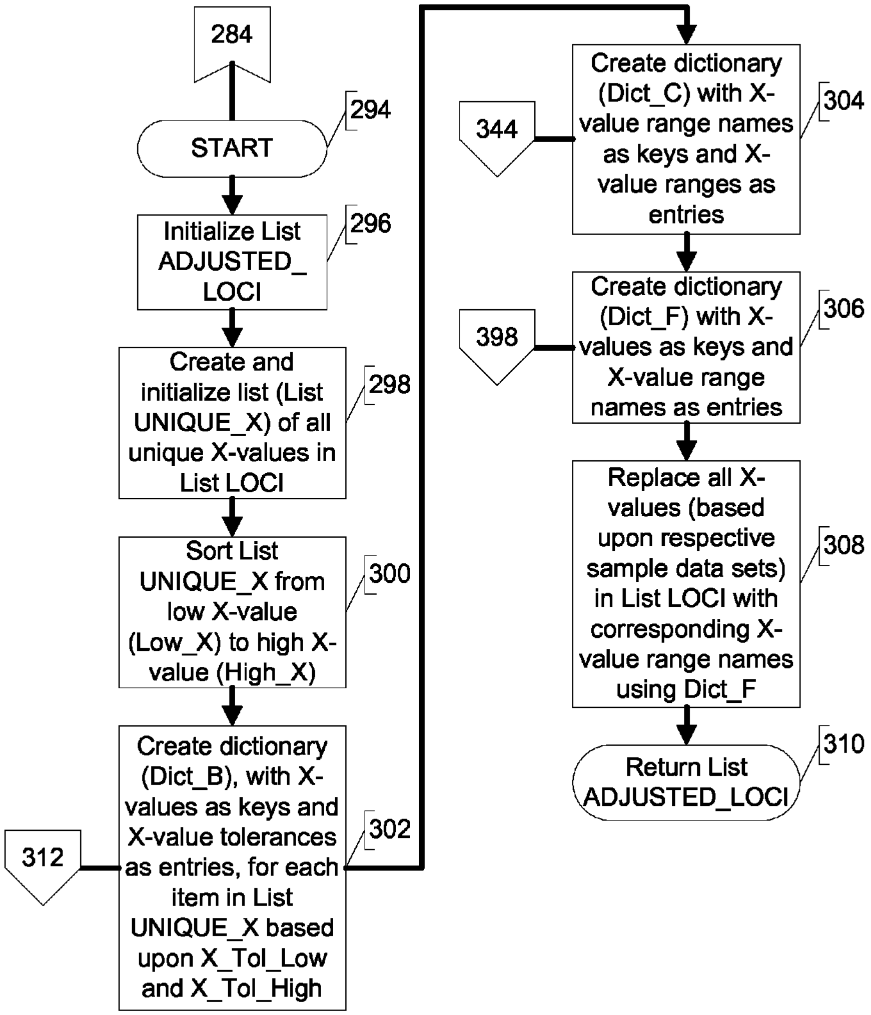
FIG. 14 shows an example method for populating a list of adjusted loci with the pluralities of loci that satisfy the loci X-value tolerance requirement.

FIG. 14 shows an example method 284 for populating List ADJUSTED_LOCI for all sample data sets with the pluralities of associated loci that satisfy the loci X-value tolerance (as determined at block 280 of FIG. 13) requirement. The method 284 initializes at block 294, and at block 296 List ADJUSTED_LOCI is initialized. At block 298, a list (hereafter "List UNIQUE_X"), which is a listing of all the unique loci X-values in List LOCI, is created and initialized. At block 300, List UNIQUE_X is sorted from the low unique locus X-value (hereafter "Low_X") to the high unique locus X-value (hereafter "High_X"). At block 302, a dictionary (hereafter "Dict_B"), with loci X-values as keys and corresponding calculated X-value tolerance values as entries, is created for each unique loci X-value of List UNIQUE_X based upon the values of X_Tol_Low and X_Tol_High (as determined at block 264 of FIG. 6); this process of calculating the associated tolerance value for each unique loci X-value is described in more detail with reference to FIG. 15. At block 304, a dictionary (hereafter "Dict_C"), with loci X-value range names as keys and corresponding loci X-value ranges as entries, is created; this is described in more detail with reference to FIGS. 16-18. At block 306, a dictionary (hereafter "Dict_F"), with loci X-values as keys and corresponding loci X-value range names as entries, is created; this is described in more detail with reference to FIG. 19. At block 308, all the loci X-values of List LOCI are replaced with corresponding loci X-value range names using Dict_F and based upon respective source sample data sets. At block 310, the completed List ADJUSTED_LOCI is returned, and the method 284 is complete.

Figure 15:
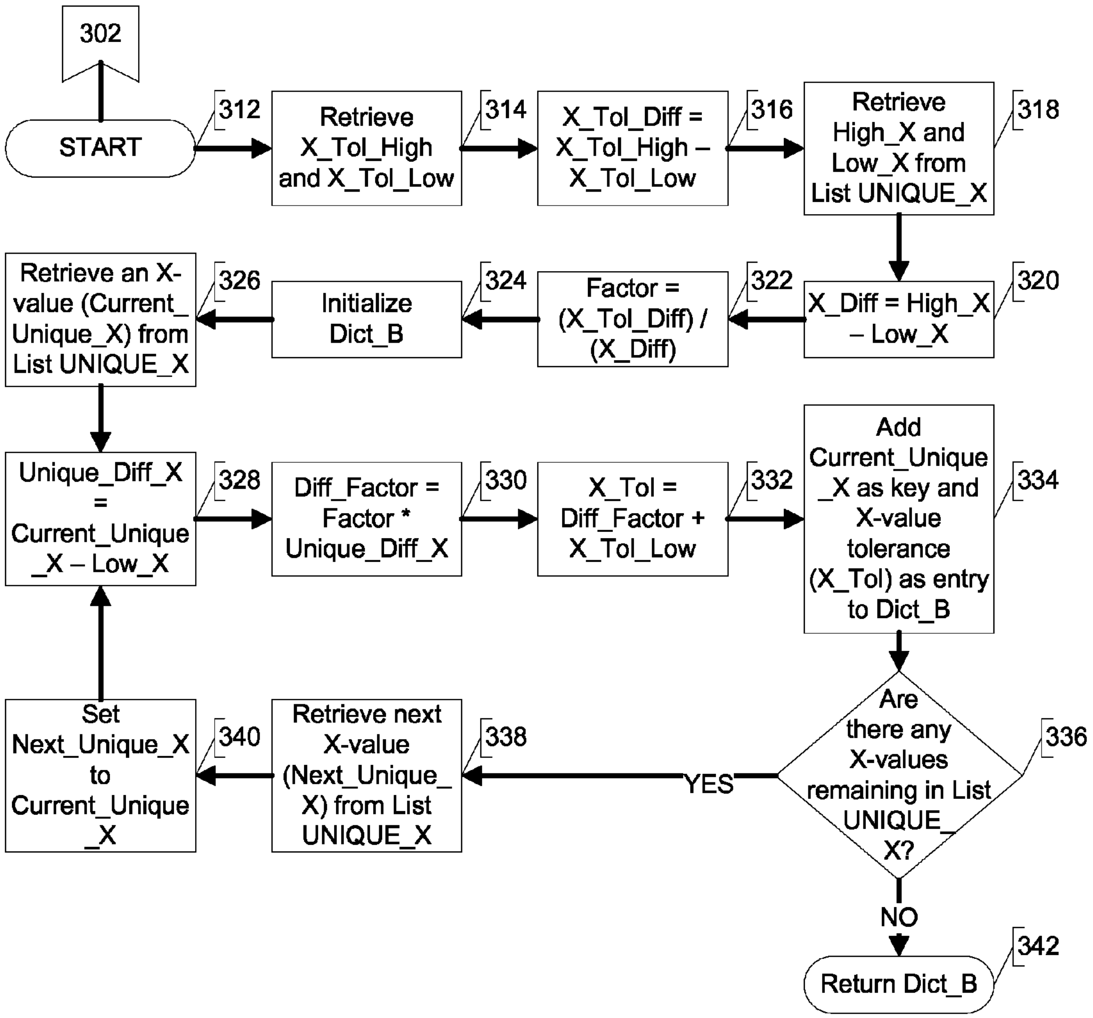
FIG. 15 shows an example method for calculating loci X-value tolerances for each unique locus X-value.

FIG. 15 shows an example method 302 for calculating loci X-value tolerances for each unique locus X-value of List UNIQUE_X based upon the values of X_Tol_High and X_Tol_Low (as determined at block 264 of FIG. 6), assuming a linear relationship from high to low, and populating Dict_B with unique locus X-values as keys and corresponding calculated locus X-value tolerances as entries. The method 302 initializes at block 312, and at block 314 the X_Tol_High and X_Tol_Low values are retrieved. At block 316, the difference (hereafter "X_Tol Diff") between X_Tol_High and X_Tol_Low is calculated. At block 318, the High_X and Low_X values (as determined at block 300 of FIG. 14) are retrieved from List UNIQUE_X. At block 320, the difference (hereafter "X_Diff") between High_X and Low_X is calculated. At block 322, the quotient (hereafter "Factor") of X_Tol_Diff and X_Diff is calculated. At block 324, Dict_B is initialized. At block 326, a unique locus X-value (hereafter "Current_Unique X") from List UNIQUE_X is retrieved. At block 328, the difference (hereafter "Unique_Diff_X") between Current_ Unique_X and Low_X is calculated. At block 330, the product (hereafter "Diff_Factor") of Factor and Unique_ Diff_X is calculated. At block 332, the sum, or locus X-value tolerance value (hereafter "X_Tol"), of Diff_Factor and X_Tol_Low is calculated; this calculated X_Tol value is the X-value tolerance corresponding to Current_Unique_X. At block 334, Current_Unique_X is added as the key and the corresponding X_Tol value is added as the entry to Dict_B. At block 336, a decision is made as to whether there are any unique loci X-values remaining in List UNIQUE_X. If YES at block 336, at block 338 the next unique locus X-value (hereafter "Next_Unique_X") from List UNIQUE_X is retrieved. At block 340, Next_Unique_X is set to Current_Unique_X, and the method 302 returns to block 328. If NO at block 336, at block 342 the completed Dict_B is returned, and the method 302 is complete.

Figure 16:
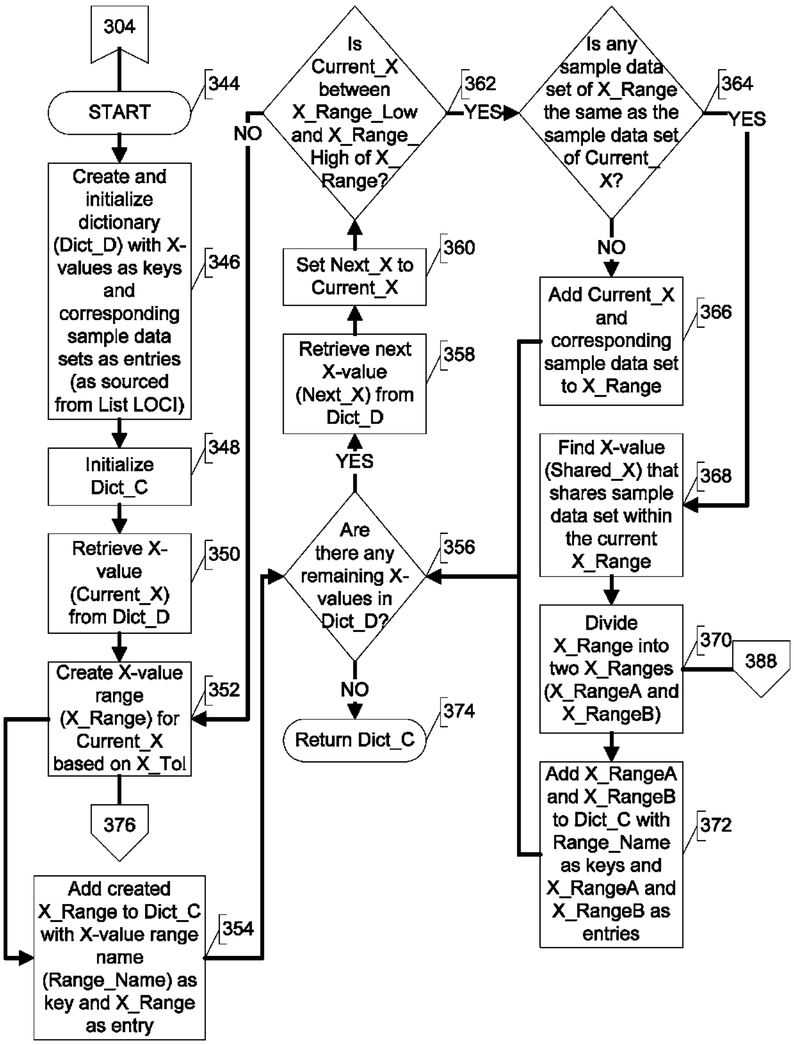
FIG. 16 shows an example method for creating loci X-value ranges for each locus X-value of the sample data sets based upon the loci X-value tolerance.

FIG. 16 shows an example method 304 for creating loci X-value ranges for each locus X-value of List LOCI based upon the X_Tol values (as calculated at FIG. 15) and for populating Dict_C with loci X-value range names as keys and corresponding loci X-value ranges as entries. The method 304 initializes at block 344, and at block 346 a dictionary (hereafter "Dict_D"), with loci X-values as keys and corresponding sample data sets containing said loci X-value as entries (as sourced from List LOCI), is created and initialized. At block 348, Dict_C is initialized. At block 350, a locus X-value (hereafter "Current_X") from Dict_D is retrieved. At block 352, an X-value range (hereafter "X_Range") is created for Current_X based upon X_Tol; this is described in more detail with reference to FIG. 17. In this instance, X_Range has the following object properties: a low X_Range value, which is the locus X-value at the low end of X_Range; a high X_Range value, which is the locus X-value at the high end of X_Range; a X-value range name (hereafter "Range_Name"), which is set to Current_X and functions as a reference for a given X_Range value; and a dictionary (hereafter "Dict_E"), with locus X-values (e.g., Current_X) as keys and corresponding sample data sets (as sourced from Dict_D) as entries. At block 354, the created X_Range and its corresponding Range_Name are added to Dict_C. At block 356, a decision is made as to whether there are any loci X-values (i.e., Current_X) remaining in Dict_D. If YES at block 356, the method 304 proceeds to block 358. If NO at block 356, the method 304 proceeds to block 374.

At block 358 of FIG. 16, the next locus X-value (hereafter "Next_X") from Dict_D is retrieved. At block 360, Next_X is set to Current_X. At block 362, a decision is made as to whether the value of Current_X is between the low and high X_Range values (as determined at FIG. 17) of the current X_Range; otherwise stated, a decision is made as to whether Current_X falls within the limits of the previously created X_Range. If YES at block 362, the method 304 proceeds to block 364. If NO at block 362, the method 304 returns to block 352.

At block 364 of FIG. 16, a decision is made as to whether any of the sample data sets of X_Range is the same as the sample data set of Current_X; otherwise stated, a decision is made as to whether Current_X, which falls within a given X_Range, is sourced from the same sample data set as is already included in X_Range. If YES at block 364, the method 304 proceeds to block 368. If NO at block 364, at block 366 Current_X and its corresponding sample data set are added to X_Range, and the method 304 returns to block 356.

At block 368 of FIG. 16, the locus X-value (hereafter "Shared_X") sharing a sample data set with Current_X (which is located within the current_X_Range) is found. At block 370, the X_Range is divided into X_RangeA and X_RangeB; this is described in more detail with reference to FIG. 18. At block 372, X_RangeA and X_RangeB are added as entries and the corresponding Range_Name values are added as keys to Dict_C. The method 304 then returns to block 356.

At block 374 of FIG. 16, the completed Dict_C is returned, and the method 304 is complete.

Figure 17:
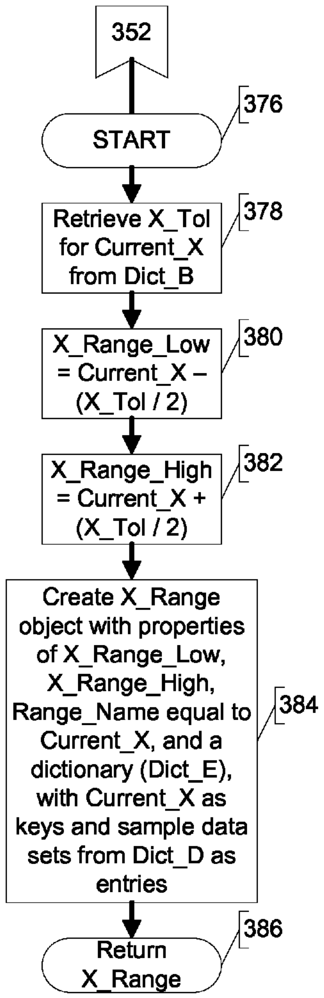
FIG. 17 shows an example method for creating a loci X-value range for a given locus X-value based upon the loci X-value tolerance.

FIG. 17 shows an example method 352 for creating an X_Range for a given locus X-value (i.e., Current_X) based upon X_Tol (as calculated at FIG. 15). The method 352 initializes at block 376, and at block 378 the X_Tol value corresponding to Current_X is retrieved from Dict_B. At block 380, the difference (i.e., X_Range_Low) between Current_X and X_Tol divided by two is calculated. At block 382, the sum (i.e., X_Range_High) of Current_X and X_Tol divided by 2 is calculated. At block 384, X_Range is created with the properties of X_Range_Low; X_Range_High; Range_Name, which is set to Current_X; and a dictionary (hereafter "Dict_E"), with Current_X values as keys and corresponding sample data sets (as sourced from Dict_D) as entries. At block 386, the completed X_Range is returned, and the method 352 is complete.

Figure 18:
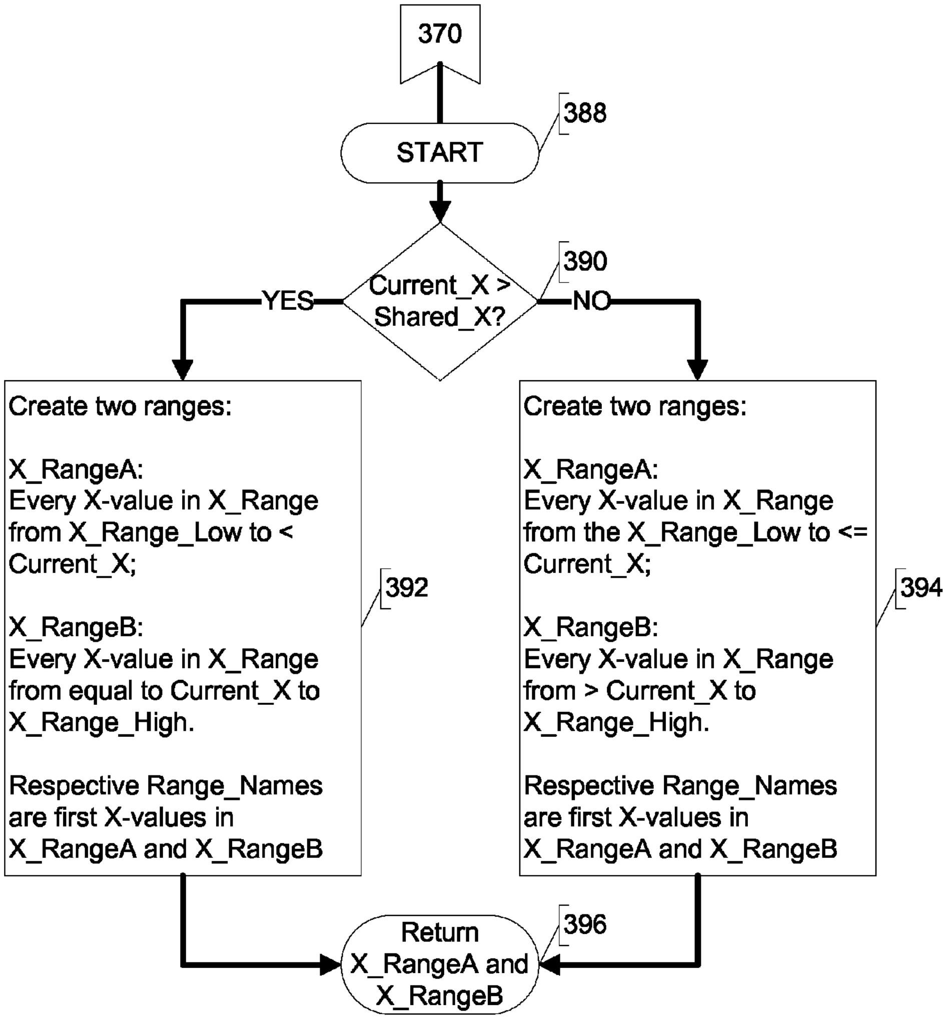
FIG. 18 shows an example method for dividing, when necessary, the current loci X-value range into two loci X-value ranges.

FIG. 18 shows an example method 370 for dividing, when necessary, the current X_Range into two X_Range objects (i.e., X_RangeA and X_RangeB). The splitting of a given X_Range (which is to be accomplished at Current_X) results from the occurrence of two loci X-values from the same sample data set falling within the same X_Range thus indicating that the two loci X-values are independently significant loci that cannot be assimilated into the same X_Range without potentially sacrificing important data or meaning. The method 370 initializes at block 388, and at block 390 a decision is made as to whether the value of Current_X is greater than the value of Shared_X. If YES at block 390, at block 392 two loci X-value ranges are created per the following: X_RangeA contains every locus X-value of X_Range from X_Range_Low to less than the Current_X value, and X_RangeB contains every locus X-value in X_Range from equal to the Current_X value to X_Range_High. The method 370 then proceeds to block 396. If NO at block 390, at block 394 two loci X-value ranges are created per the following: X_RangeA contains every locus X-value in X_Range from X_Range_Low to less than or equal to the Current_X value, and X_RangeB contains every locus X-value in X_Range from greater than the Current_X value to X_Range_High. In either case, the associated Range_Names of X_RangeA and X_RangeB are the first locus X-values of the respective ranges. At block 396, the completed X_RangeA and X_RangeB are returned, and the method 370 is complete.

For illustrative purposes, the following example uses mass spectroscopy data to show X-value (i.e., peak m/Z value) range partitioning as described in FIG. 18. In one instance, assume a peak m/Z range (i.e., X_Range) is created with the following properties: a low value (i.e., X_Range_Low) of 2,000; a high value (i.e., X_Range_High) of 2,002; a name (i.e., Range_Name) of "2,000.5" (hereafter "Range__2,000.5"); and a dictionary (i.e., Dict_E), with peak m/Z value 2,000.5 (i.e., key 1) found in Data sets 1 and 2 (i.e., entry 1) and peak m/Z value 2,001 (i.e., key 2) found in Data sets 3 and 4 (i.e., entry 2).

In one instance, peak m/Z value 2,001.5 (i.e., Current_X) from Data set 1 is slated to be assimilated into the Range__2,000.5 as said peak falls neatly between the low and high values of Range__2,000.5. However, peak m/Z value 2,001.5 is found in Data set 1, and since the Range__2,000.5 already contains Data set 1 as part of its dictionary, the current peak m/Z value 2,001.5 cannot be inserted as part of the Range__2,000.5. Otherwise stated, the presence of peak m/Z values 2,000.5 (i.e., Shared_X) and 2,001.5 in Data set 1 indicates that these are theoretically different peaks representing the presence of different ions, molecules or fragments in the current sample. Accordingly, said peaks are markedly different and cannot be assimilated into the same peak range; thus, the current peak m/Z value range must be split into two separate ranges.

Since peak m/Z value 2,001.5 is greater than peak m/Z value 2,000.5, the two peak ranges are created as follows. Peak m/Z range A is created with a low value of 2,000; a high value of 2,001; a range name of "Range__2,000.5," which in this instance refers to the first peak m/Z value of said range; and a dictionary, with peak m/Z value 2,000.5 (i.e., key 1) found in Data sets 1 and 2 (i.e., entry 1) and peak m/Z value 2,001 (i.e., key 2) found in Data sets 3 and 4 (i.e., entry 2). Peak m/Z range B is created with a low value of 2,001; a high value of 2,002; a range name of "Range__2,001.5," which in this instance refers to the first peak m/Z value of said range; and a dictionary; with peak m/Z value 2,001.5 (i.e., key 1) found in Data set 1 (i.e., entry 1).

Figure 19:
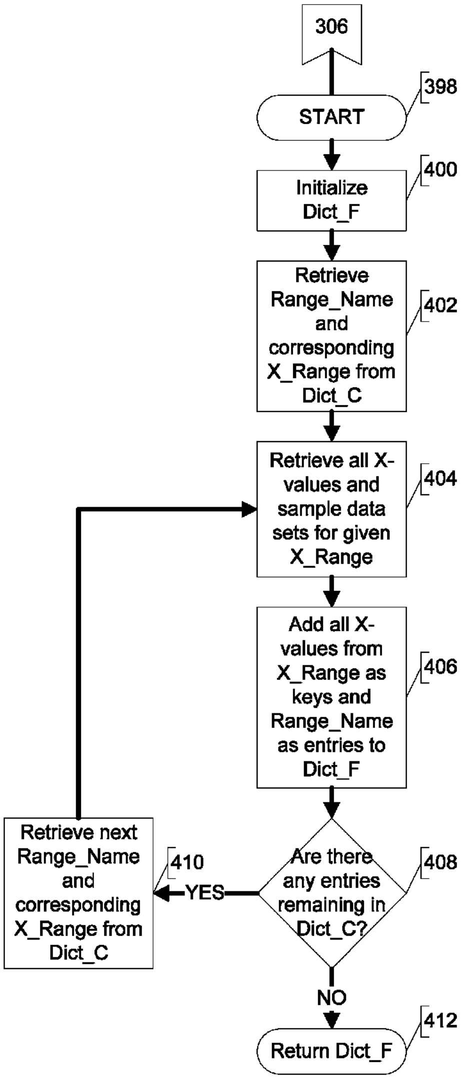
FIG. 19 shows an example method for determine which loci X-values of the sample data sets are to be replaced with which respective adjusted loci X-values.

FIG. 19 shows an example method 306 for determining which loci X-values of List LOCI are to be replaced with which respective "adjusted" loci X-values. To that end, all loci X-values and the corresponding sample data sets for a given X_Range are retrieved from the range objects of Dict_C. The method 306 initializes at block 398, and at block 400 Dict_F, with loci X-values as keys and corresponding loci X-value range names (i.e., Range_Name) as entries, is initialized. At block 402, a Range_Name and corresponding X_Range from Dict_C are retrieved. At block 404, all loci X-values and corresponding sample data sets for the given X_Range are retrieved. At block 406, all loci X-values from X_Range are added as keys and corresponding Range_Names are added as entries to Dict_F. At block 408, a decision is made as to whether there are any Range_Name keys remaining in Dict_C. If YES at block 408, at block 410 the next Range_Name and corresponding X_Range are retrieved from Dict_C, and the method 306 returns to block 404. If NO at block 408, at block 412 the completed Dict_F is returned, and the method 306 is complete.

Figure 20:
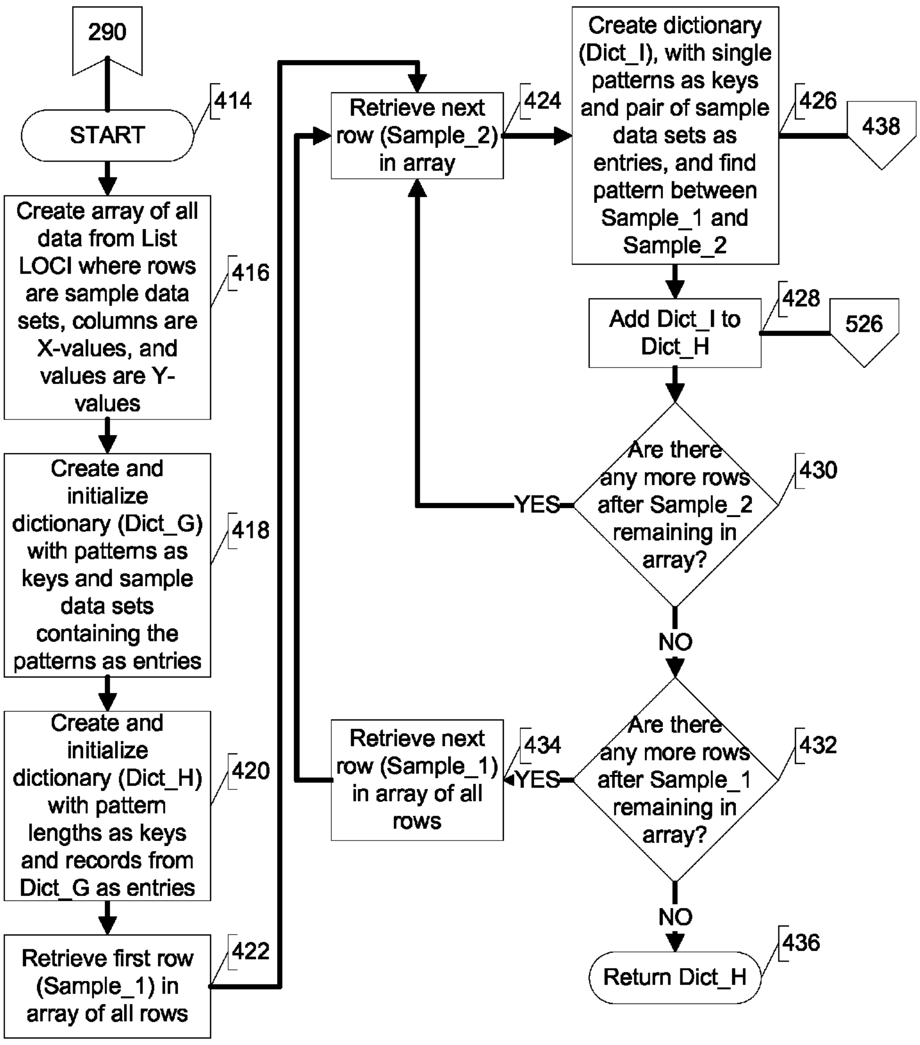
FIG. 20 shows an example method for finding patterns between and among the sample data sets.

FIG. 20 shows an example method 290 for finding patterns within List LOCI, which is converted to an array, or any other user-specified, preset, or automatically determined, storage structure, for said purpose. Specifically, patterns are identified by iteratively comparing the first sample data set with each subsequent sample data set; these patterns are stored in a temporary dictionary and are subsequently added to a master dictionary of all patterns. Once patterns between the first sample data set and the subsequent sample data sets are retrieved, the second sample data set is compared with each subsequent sample data set excluding the first; the third sample data set is compared with each subsequent sample data set excluding the first and second; etc.

The method 290 of FIG. 20 initializes at block 414, and at block 416 an array of all data from List LOCI, in which the array rows are sample data sets, the array columns are loci X-values, and the array values are the loci Y-values, is created. At block 418, a dictionary (hereafter "Dict_G"), with patterns as keys and corresponding sample data sets containing said patterns as entries, is created and initialized. At block 420, a dictionary (hereafter "Dict_H"), which functions as the master dictionary of patterns and has pattern lengths as keys and corresponding records from Dict_G as entries, is created and initialized. At block 422, the first row (hereafter "Sample_1") in the array of all rows is retrieved. At block 424, the next row (hereafter "Sample_2") in the array is retrieved. At block 426, a dictionary (hereafter "Dict_I"), which functions as the temporary dictionary of patterns and has patterns as keys and corresponding sample data set pairs (i.e., Sample_1 and Sample_2) as entries, is created, and then patterns are found between Sample_1 and Sample_2; this is described in more detail in FIGS. 21-25. At block 428, the completed Dict_I is added to Dict_H; this is described in more detail in FIG. 26. At block 430, a decision is made as to whether there are any more rows after Sample_2 remaining in the array. If YES at block 430, the method 290 returns to block 424. If NO at block 430, at block 432 a decision is made as to whether there are any more rows after Sample_1 remaining in the array of all rows. If YES at block 432, at block 434 the next row (i.e., Sample_1) in the array of all rows is retrieved, and the method 290 returns to block 424. If NO at block 432, at block 436, the completed Dict_H is returned, and the method 290 is complete.

Figure 21:
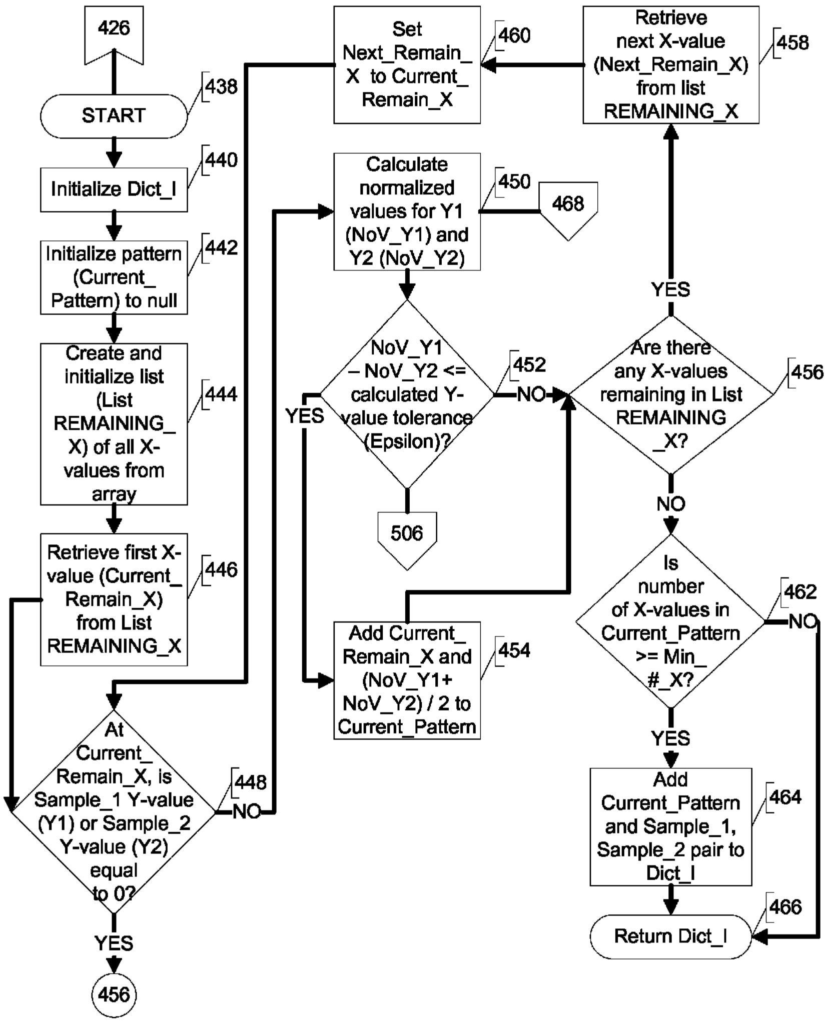
FIG. 21 shows an example method for identifying a pattern that exists between Sample1 and Sample2.

FIG. 21 shows an example method 426 for identifying a pattern that exists between Sample_1 and Sample_2 of the array generated from List LOCI (at block 416 of FIG. 20). For the purpose of this discussion, a pattern has object properties including a listing of loci X-values and corresponding loci Y-values, a calculated loci Y-value tolerance value (hereafter "Epsilon") (as calculated in FIG. 25), and a Pattern_Type (as determined at block 266 of FIG. 6). Otherwise stated, for each locus X-value present in both Sample_1 and Sample_2, the correlative locus Y-values are each "normalized" (as described in FIGS. 22-24) to the first locus Y-value of the respective sample data set (hereafter "Y1" for Sample_1 and "Y2" for Sample_2 for the given iteration) based upon the Pattern_Type to be identified. This normalization process makes possible the identification of patterns within the given sample data sets but does not alter, adjust, or correct the data. Once satisfied, the current locus X-value and the mean of the normalized locus Y-values of Sample_1 and Sample_2, as well as the associated sample data sets (i.e., Sample_1 and Sample_2), are saved as part of the current pattern, and the process repeats iteratively for the remaining loci X-values of Sample_1 and Sample_2.

The method 426 of FIG. 21 initializes at block 438, and at block 440 Dict_I is initialized. At block 442, a pattern (hereafter "Current_Pattern) is initialized to null. At block 444, a list (hereafter "List REMAINING_X"), which is a listing of all loci X-values from the array, is created and initialized. At block 446, the first locus X-value (hereafter "Current_Remain_X") of List REMAINING_X is retrieved. At block 448, a decision is made as to whether the Sample_1 locus Y-value (i.e., "Y1") or the Sample_2 locus Y-value (i.e., "Y2) corresponding to locus Current_Remain_X is equal to zero. With regard to mass spectroscopy data, a value of zero here indicates that the current sample data set does not contain a peak for the given m/Z (i.e., X) value, and thus a pattern cannot exist. If YES at block 448, the method 426 proceeds to block 456. If NO at block 448, at block 450 Y1 of Sample_1 and Y2 of Sample_2, both of which correspond to locus Current_Remain_X, are normalized to values "NoV_Y1" and "Nov_Y2," respectively, based upon the Pattern_Type (as determined at block 266 of FIG. 6); this is described in more detail in FIGS. 22-24. At block 452, a decision is made as to whether the difference between NoV_Y1 and NoV_Y2 is less than or equal to the calculated Y-value tolerance (hereafter "Epsilon"). The calculation of the Epsilon value is described in more detail in FIG. 25. If YES at block 452, at block 454 Current_Remain_X is added as the locus X-value and the mean of NoV_Y1 and NoV_Y2 is added as the locus Y-value to Current_Pattern, and the method 426 proceeds to block 456. If NO at block 452, the method 426 proceeds to block 456.

At block 456 of FIG. 21, a decision is made as to whether there are any loci X-values remaining in List REMAINING_X. If YES at block 456, at block 458 the next locus X-value (hereafter "Next_Remain_X") from List REMAINING_X is retrieved. At block 460, Next_Remain_X is set to Current_Remain_X, and the method 426 returns to block 448. If NO at block 456, at block 462 a decision is made as to whether the number of loci X-values in Current_Pattern is greater than or equal to Min_#_X (as determined at block 268 of FIG. 6). If YES at block 462, at block 464 the Current_Pattern is added as the key and the Sample_1, Sample_2 pair is added as the corresponding entry to Dict_I, and the method 426 proceeds to block 466. If NO at block 462, at block 466 the completed Dict_I is returned, and the method 426 is complete.

Figure 22:
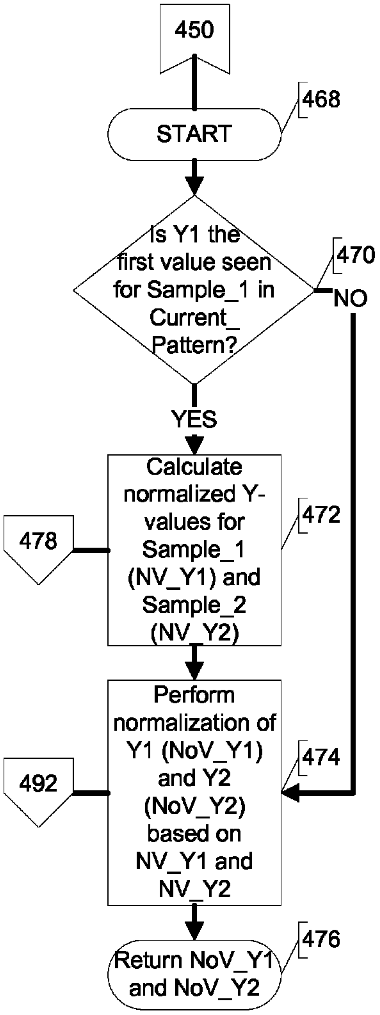
FIG. 22 shows an example method for normalizing the loci Y-values of Sample1 and Sample2 for the current pattern.

FIG. 22 shows an example method 450 for normalizing the loci Y-values (i.e., Y1 and Y2, respectively) of Sample_1 and Sample_2 for the Current_Pattern. If Y1, which corresponds to Current_Remain_X, in Sample_1 is the first locus Y-value for the Current_Pattern being constructed, then the normalization value for Y1 (hereafter "NV_Y1"), and subsequently Y2 (hereafter "NV_Y2"), for the Current_Pattern between Sample_1 and Sample_2 must be calculated based upon the Pattern_Type (as determined at block 266 of FIG. 6); this is performed only once per pattern. Based upon the loci normalization values NV_Y1 and NV_Y2 and the Pattern_Type, the remaining loci Y-values (i.e., those following the first locus Y-value) of Sample_1 and Sample_2 for the Current_Pattern are respectively normalized.

The method 450 of FIG. 22 initializes at block 468, and at block 470 a decision is made as to whether Y1 of Sample_1 is the first locus Y-value to be seen for Sample_1 in the Current_Pattern. If YES at block 470, at block 472 the normalization values for Y1 of Sample_1 and Y2 of Sample_2 are calculated based upon the Pattern_Type (as determined at block 266 of FIG. 6) to generate values NV_Y1 and NV_Y2, respectively; this is described in more detail in FIG. 23. The method 450 then proceeds to block 474. If NO at block 470, at block 474 the remaining loci Y-values of Sample_1 and Sample_2 are normalized based upon the Pattern_Type and the values calculated for NV_Y1 and NV_Y2, respectively, to yield NoV_Y1 and NoV_Y2, respectively; this is described in more detail in FIG. 24. At block 476, the calculated values of NoV_Y1 and NoV_Y2 are returned, and method 450 is complete.

Figure 23:
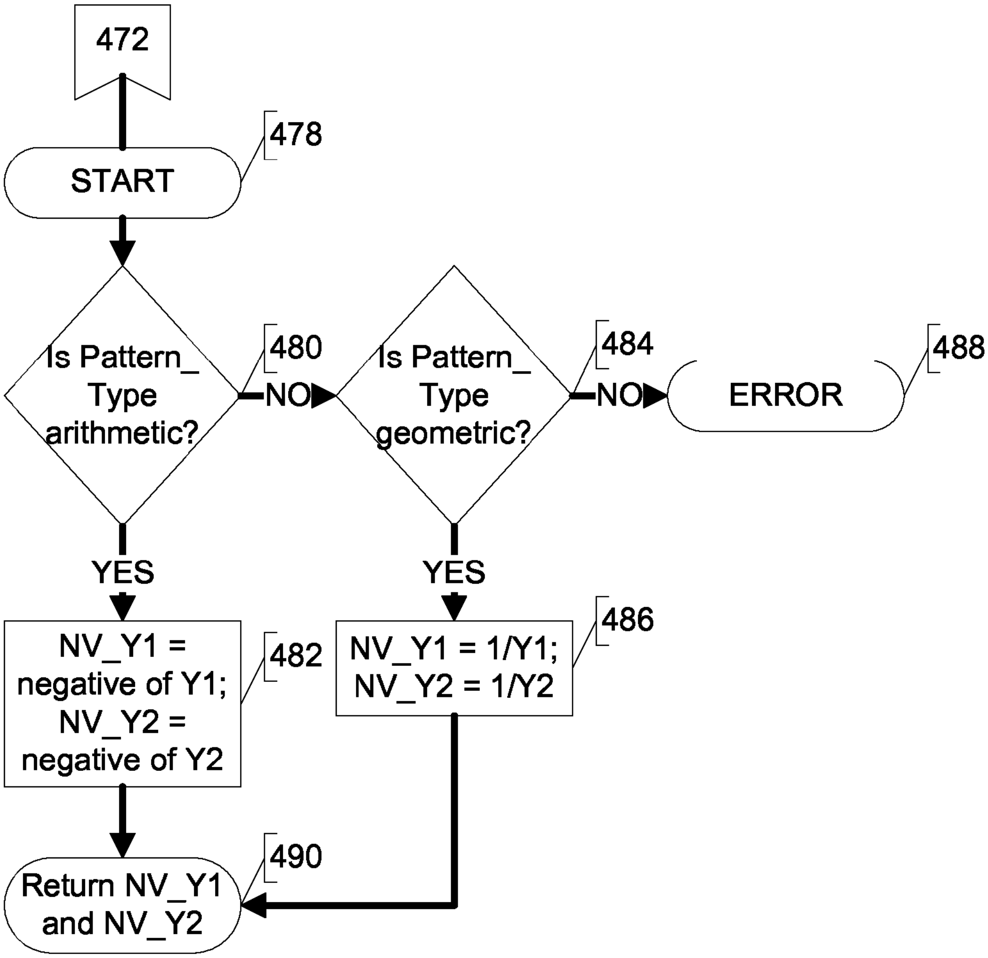
FIG. 23 shows an example method for calculating the normalization value at the current locus X-value for the current pattern.

FIG. 23 shows an example method 472 for calculating the normalization value (NV_Y1 for Sample_1 and NV_Y2 for Sample_2) at Current_Remain_X for the Current_Pattern. These normalization values are used later to normalize the remaining loci Y-values of Sample_1 and Sample_2 of the Current_Pattern. The method 472 initializes at block 478, and at block 480 a decision is made as to whether the Pattern_Type (as determined at block 266 of FIG. 6) is set to arithmetic. If YES at block 480, at block 482 the value of NV_Y1 is calculated to be equal to the negative value of Y1, and the value of NV_Y2 is calculated to be equal to the negative value of Y2. The method 472 then proceeds to block 490. If NO at block 480, at block 484 a decision is made as to whether the Pattern_Type is set to geometric. If YES at block 484, at block 486 the value of NV_Y1 is calculated to be the inverse of Y1, and the value of NV_Y2 is calculated to be the inverse of Y2. The method 472 then proceeds to block 490. If NO at block 484, in one embodiment at block 488 the method 472 returns an ERROR; in an alternate embodiment, at block 488 the method 472 continues to test conditions for other Pattern_Type values (e.g., trigonometric, exponential, etc.). At block 490, the values of NV_Y1 for Sample_1 and NV_Y2 for Sample_2 are returned, and the method 472 is complete.

Figure 24:
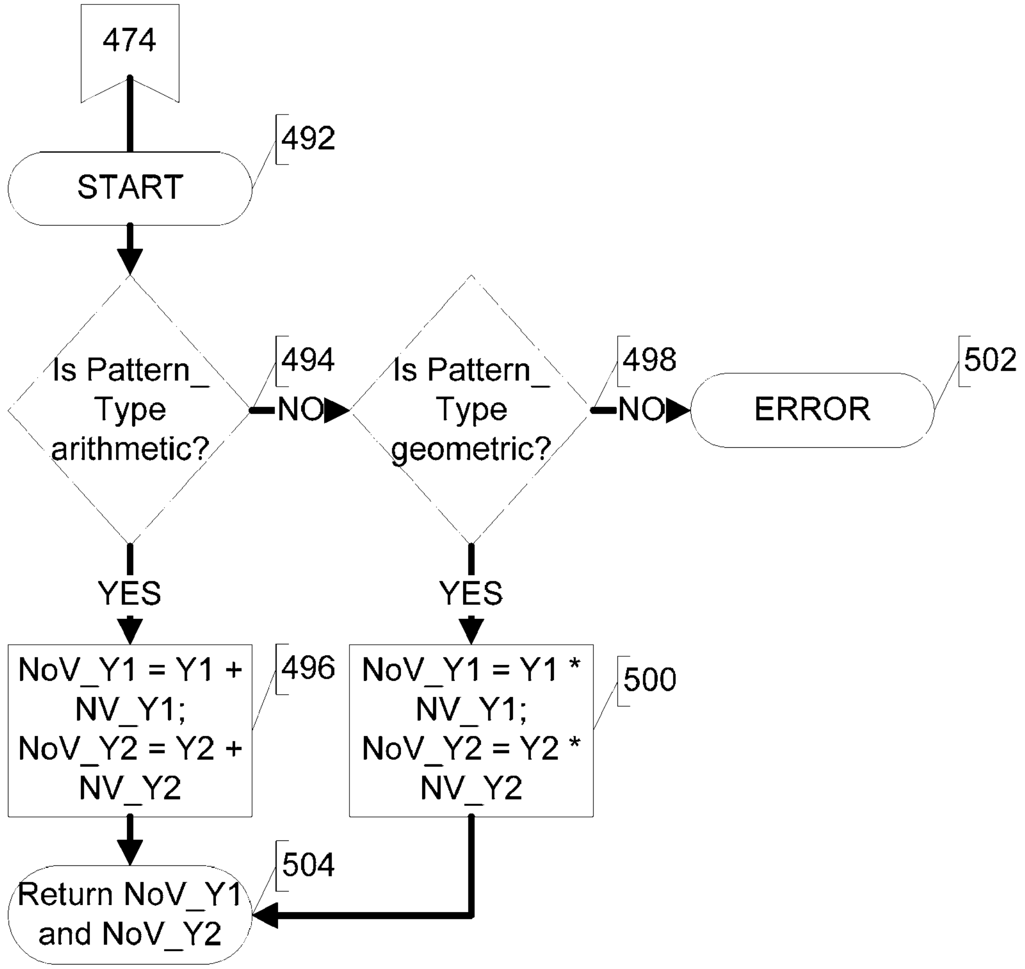
FIG. 24 shows an example method for normalizing the remaining loci Y-values of Sample1 and Sample2 of the current pattern based upon the normalization values of Y1 and Y2 and the pattern type.

FIG. 24 shows an example method 474 for normalizing the remaining loci Y-values of Sample_1 and Sample_2 of the Current_Pattern based upon the values of NV_Y1 and NV_Y2 (as calculated at FIG. 23), respectively, and the Pattern_Type (as determined at block 266 of FIG. 6). The method 474 initializes at block 492, and at block 494 a decision is made as to whether the Pattern_Type (as determined at block 266 of FIG. 6) is set to arithmetic. If YES at block 494, at block 496 the normalized values of the remaining loci Y-values of Sample_1 (i.e., NoV_Y1) are calculated to be the sum of Y1 and NV_Y1, and the normalized values of the remaining loci Y-values of Sample_2 (i.e., NoV_Y2) are calculated to be the sum of Y2 and NV_Y2. The method 474 then proceeds to block 504. If NO at block 494, at block 498 a decision is made as to whether the Pattern_Type is geometric. If YES at block 498, at block 500 the normalized values of the remaining loci Y-values of Sample_1 (i.e., NoV_Y1) are calculated to be the product of Y1 and NV_Y1, and the normalized values of the remaining loci Y-values of Sample_2 (i.e., NoV_Y2) are calculated to be the product of Y2 and NV_Y2. The method 474 then proceeds to block 504. If NO at block 498, in one embodiment at block 502 the method 474 returns an ERROR; in an alternate embodiment, at block 502 the method 474 continues to test conditions for other Pattern_Type values (e.g., trigonometric, exponential, etc.). At block 504, NoV_Y1 for Sample_1 and NoV_Y2 for Sample_2 are returned, and the method 474 is complete.

Figure 25:
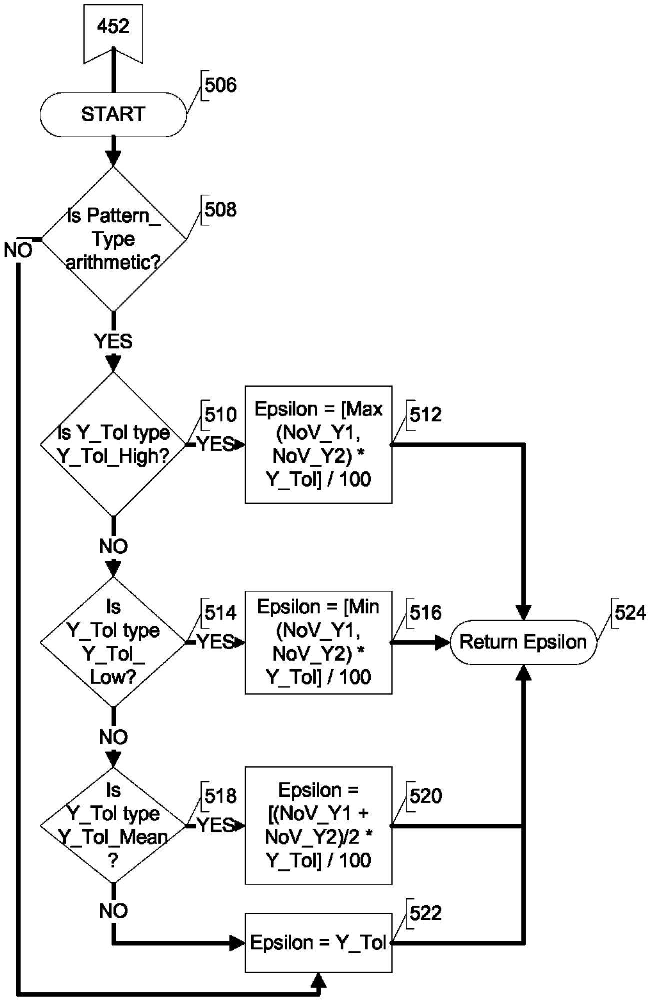
FIG. 25 shows an example method for calculating the actual loci Y-value tolerance value based upon the user-specified, preset, or automatically determined loci Y-value tolerance value as previously determined and the pattern type.

FIG. 25 shows an example method 452 for calculating the actual loci Y-value tolerance value (i.e., Epsilon value) based upon the user-specified, preset, or automatically determined Y_Tol value (as determined at block 262 of FIG. 6) and the Pattern_Type (as determined at block 266 of FIG. 6). In the instance of an arithmetic pattern, the Epsilon value is calculated as a percentage of the Y_Tol_Low, Y_Tol_High, or Y_Tol_Mean value (as determined at block 272 of FIG. 6) of the Sample_1 and Sample_2 loci Y-values, while in the instance of a geometric pattern, the Epsilon value is calculated to be equal to the Y_Tol value as previously determined; in yet another instance, the Epsilon value is calculated based upon a different Pattern_Type.

The method 452 of FIG. 25 initializes at block 506, and at block 508 a decision is made as to whether the Pattern_Type is set to arithmetic. If YES at block 508, the method 452 proceeds to block 510. If NO at block 508, the method 452 proceeds to block 522.

At block 510 of FIG. 25, a decision is made as to whether the Y_Tol type (as determined at block 272 of FIG. 6) is set to Y_Tol_High. If YES at block 510, at block 512 the Epsilon value is calculated per the following: the maximum value between NoV_Y1 and NoV_Y2 (as calculated at FIG. 24) is determined, and this is multiplied by the Y_Tol value. This product is then divided by 100 to yield Epsilon. The method 452 then proceeds to block 524. If NO at block 510, at block 514 a decision is made as to whether the Y_Tol type is set to Y_Tol_Low. If YES at block 514, at block 516 the Epsilon value is calculated per the following: the minimum value between NoV_Y1 and NoV_Y2 is determined, and this is multiplied by the Y_Tol value. This product is then divided by 100 to yield Epsilon. The method 452 then proceeds to block 524. If NO at block 514, at block 518 a decision is made as to whether the Y_Tol type is set to Y_Tol_Mean. If YES at block 518, at block 520 the Epsilon value is calculated per the following: the sum of NoV_Y1 and NoV_Y2 is divided by two, and this is multiplied by the Y_Tol value. This product is then divided by 100 to yield Epsilon. The method 452 then proceeds to block 524. If NO at block 518, at block 522 the Epsilon value is set to the Y_Tol value, and the method 452 proceeds to block 524. At block 524, the Epsilon value is returned, and the method 452 is complete.

Figure 26:
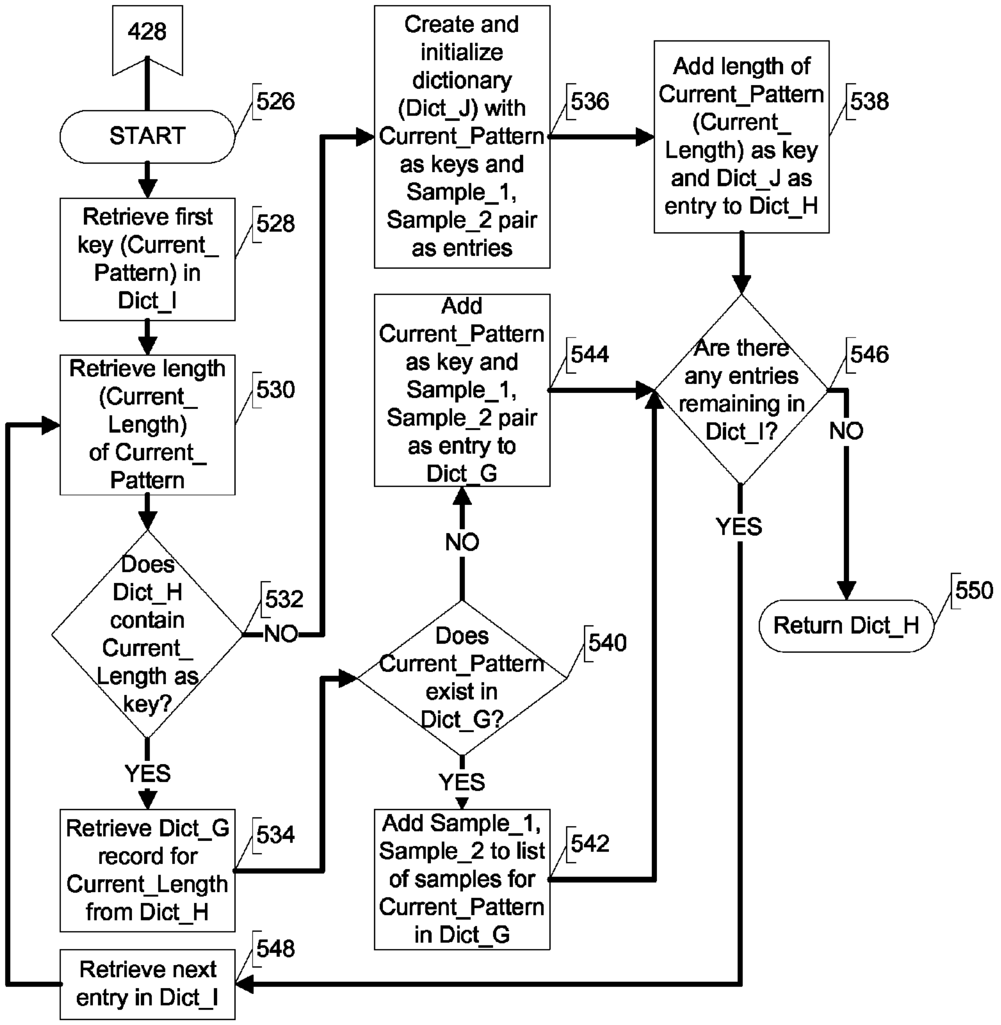
FIG. 26 shows an example method for adding the identified temporary patterns to the list of master patterns.

FIG. 26 shows an example method 428 for adding the identified temporary patterns (i.e., Dict_I) to the list of master patterns (i.e., Dict_H). Simply, for every pattern in Dict_I and if the pattern already exists in Dict_H, the sample data sets for the given pattern in Dict_I are added to the sample data sets of the already existing pattern entry in Dict_H. Alternately, if the pattern does not exist, then the pattern and its corresponding sample data sets are added as a new entry to Dict_H. The method 428 initializes at block 526, and at block 528 the first key (hereafter "Current_Pattern") of Dict_I is retrieved. At block 530, the length of Current_Pattern (hereafter "Current_Length"), which is the total number of loci X-values in the pattern, is retrieved. At block 532, a decision is made as to whether Dict_H contains the length of Current_Pattern (i.e., Current_Length) as a key. If YES at block 532, at block 534 the record from Dict_G that corresponds to the length of Current_Pattern (i.e., Current_Length) is retrieved from Dict_H, and the method 428 proceeds to block 540. If NO at block 532, at block 536 a dictionary (hereafter "Dict_J"), with Current_Pattern as keys and corresponding Sample1, Sample2 pair as entries, is created and initialized. At block 538, the length of Current_Pattern is added as the key and Dict_J is added as the entry to Dict_H. The method 428 then proceeds to block 546.

At block 540 of FIG. 26, a decision is made as to whether Current_Pattern exists in Dict_G. If YES at block 540, at block 542 the Sample1, Sample2 pair are added to the list of samples for the Current_Pattern in Dict_G, and the method 428 proceeds to block 546. If NO at block 540, at block 544 the Current_Pattern is added as the key and the Sample1, Sample2 pair is added as the corresponding entry to Dict_G. The method 428 then proceeds to block 546.

At block 546 of FIG. 26, a decision is made as to whether there are any entries remaining in Dict_I. If YES at block 546, at block 548 the next entry of Dict_I is retrieved, and the method 428 returns to block 530. If NO at block 546, at block 550 the completed Dict_H is returned, and the method 428 is complete.

Figure 27:
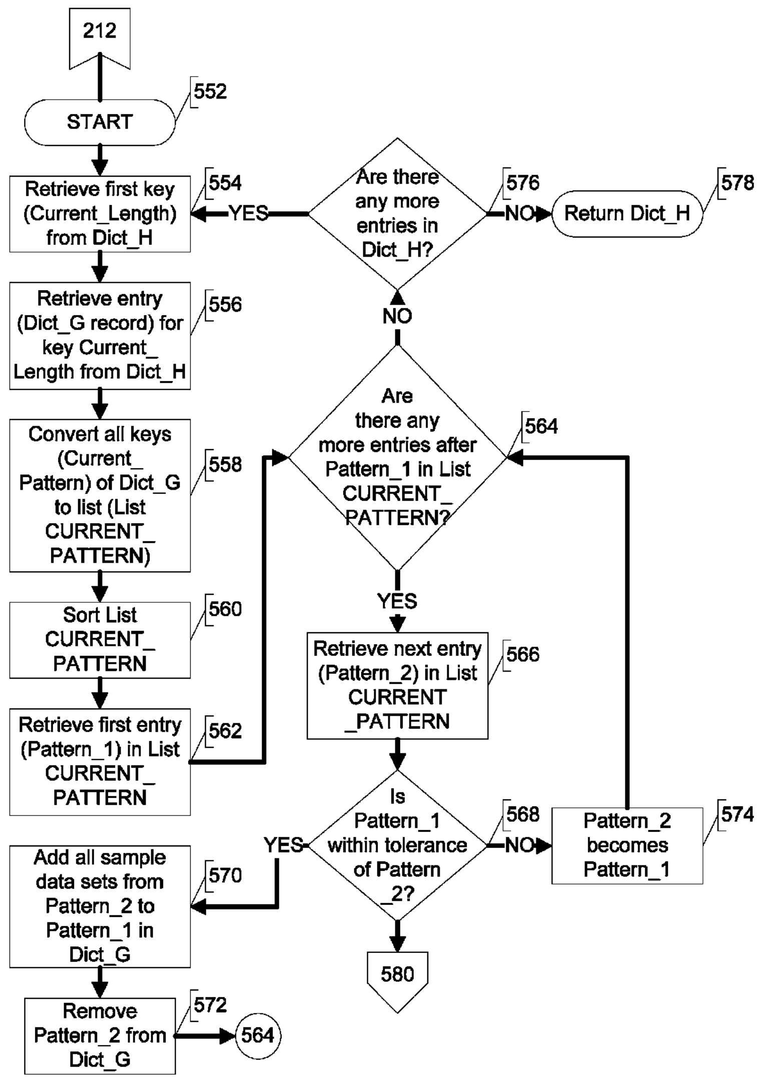
FIG. 27 shows an example method for consolidating the master list of patterns.

FIG. 27 shows an example method 212 for consolidating patterns in the master list that are within the tolerance range specified in the application parameters. Patterns that are within a tolerance range of each other (based upon the application parameters as set at FIG. 6) are consolidated as one pattern, and this pattern's associated sample data sets are updated to be the combined sample data sets of all the original patterns consolidated. Patterns are consolidated to improve the "location distribution" of the patterns; that is, consolidated patterns occur at more sample data sets thereby making them relevant for our evaluation. The method 212 initializes at block 552, and at block 554 key Current_Length is retrieved from Dict_H. At block 556, the entry (i.e., Dict_G record) corresponding to the key Current_Length is retrieved from Dict_H. At block 558, all keys of Dict_G are converted to a list (hereafter "List CURRENT_PATTERNS"). At block 560, List CURRENT_PATTERNS is sorted based upon their count and values of loci X-values and loci Y-values. Patterns with a greater number of loci X-values are sorted higher than patterns with a lower number of loci X-values. For those patterns with an equal number of loci X-values, those with higher loci X-values at corresponding positions are sorted higher. If the aforementioned are equal, patterns with higher loci Y-values at corresponding positions are sorted higher.

At block 562 of FIG. 27, the first entry (hereafter "Pattern_1") in List CURRENT_PATTERNS is retrieved. At block 564, a decision is made as to whether there are any entries after Pattern_1 remaining in List CURRENT_PATTERNS. If YES at block 564, at block 566 the next entry (hereafter "Pattern_2") in List CURRENT_PATTERNS is retrieved. At block 568, a decision is made as to whether Pattern_1 is within the tolerance of Pattern_2; this is described in more detail in FIG. 28. If YES at block 568, at block 570 all sample data sets from Pattern_2 to Pattern_1 in Dict_G. At block 572, Pattern_2 is removed from Dict_G, and the method 212 returns to block 564. If NO at block 568, at block 574 Pattern_2 becomes Pattern_1, and the method 212 returns to block 564.

If NO at block 564 of FIG. 27, at block 576 a decision is made as to whether there are any entries remaining in Dict_H. If YES at block 576, the method 212 returns to block 554. If NO at block 576, at block 578 Dict_H is returned, and the method 212 is complete.

Figure 28:
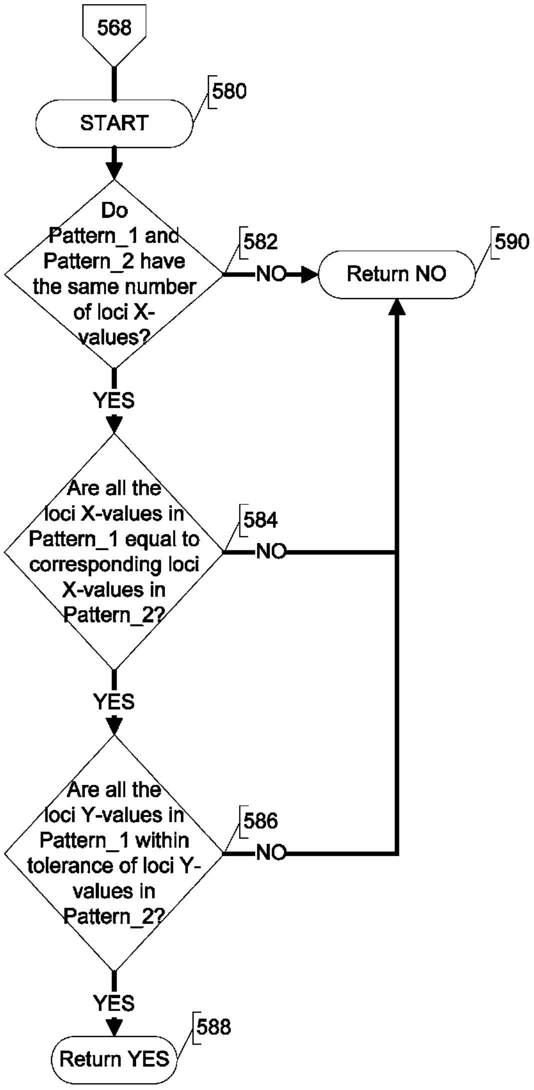
FIG. 28 shows an example method for determining whether Pattern_1 is within the tolerance of Pattern_2.

FIG. 28 shows an example method 568 for determining whether Pattern_1 is within the tolerance of Pattern_2. In two patterns, with the list loci X-values being equal, tolerances are checked for corresponding loci Y-values to see if they are close enough (based on parameters specified earlier) for the two patterns to be merged as one. The method 568 initializes at block 580, and at block 582 a decision is made as to whether Pattern_1 and Pattern_2 have the same number of loci X-values. If YES at block 582, the method 568 proceeds to block 584; if NO at block 582, the method 568 proceeds to block 590. At block 584, a decision is made as to whether all the loci X-values of Pattern_1 are equal to the corresponding loci X-values of Pattern_2. If YES at block 584, the method 568 proceeds to block 586; if NO at block 586, the method 568 proceeds to block 590. At block 586, a decision is made as to whether all the loci Y-values in Pattern_1 are within the tolerance of the loci Y-values in Pattern_2; the calculation of tolerances for different pattern types is described in more detail in FIG. 25. If YES at block 586, at block 588 YES is returned, and the method 568 is complete. If NO at block 586, at block 590 NO is returned, and the method 568 is complete.

Figure 29:
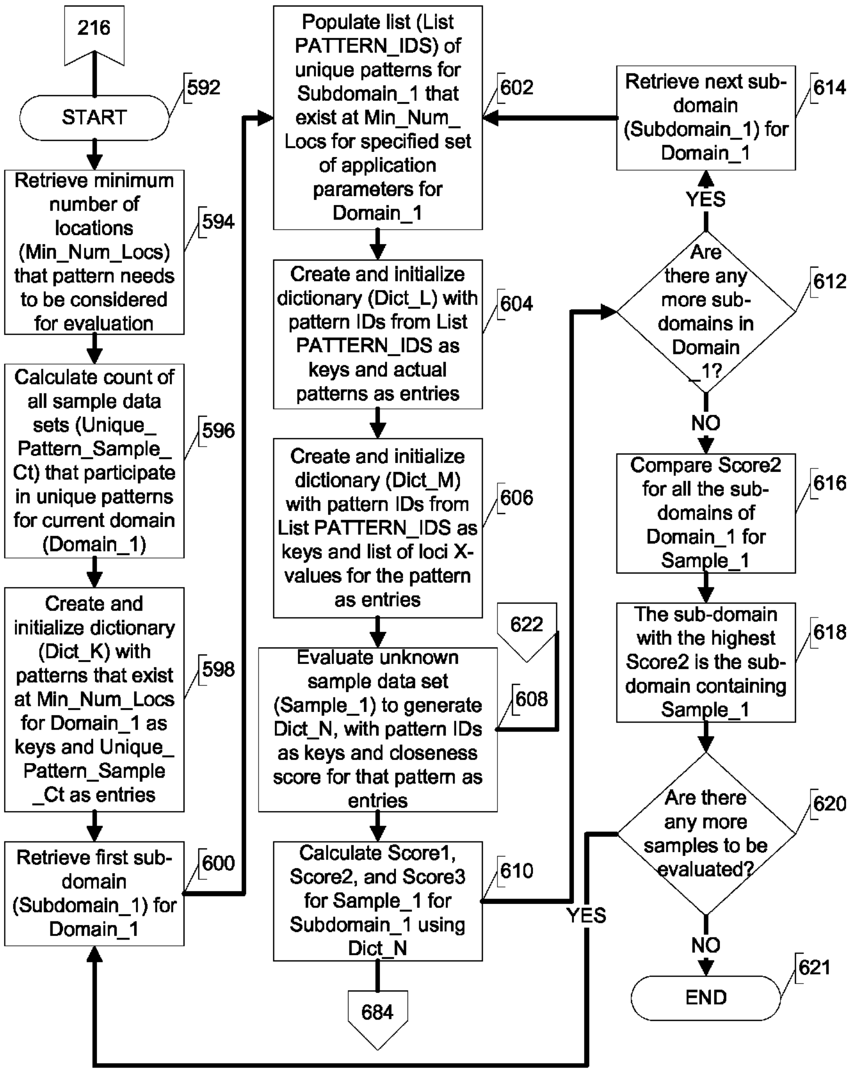
FIG. 29 shows an example method for evaluating the tuning sample data sets for Domain_1.

FIG. 29 shows an example method 216 for evaluating the tuning sample data sets for Domain_1. After the patterns are analyzed for a domain, they are tuned to be identified as "good" or "bad" patterns. Tuning consists of labeling the patterns and consolidating the good patterns as explained subsequently. For the tuning, tuning sample data sets are needed and are evaluated as unknown sample data sets. The evaluated patterns from the tuning sample data sets are used to label the earlier analyzed patterns for the domain.

The method 216 initializes at block 592, and at block 594 in one embodiment the minimum number of locations (hereafter "Min_Num_Locs") that the pattern needs to be considered for evaluation is retrieved. At block 596, the count of all sample data sets (hereafter "Unique_Pattern_Sample_Ct") that participate in the unique patterns for the current domain (i.e., Domain_1) is calculated. At block 598, a dictionary (hereafter "Dict_K"), with patterns that exist at Min_Num_Locs for Domain_1 as keys and Unique_Pattern_Sample_Ct as entries, is created and initialized. At block 600, the first sub-domain (hereafter "Subdomain_1") for Domain_1 is retrieved. At block 602, a list (hereafter "List PATTERN_IDS") of unique patterns for Subdomain_1 that exist at Min_Num_Locs for the specified set of application parameters (as determined in FIG. 6) for Domain_1 is populated. At block 604, a dictionary (hereafter "Dict_L"), with pattern IDs from List PATTERN_IDS as keys and corresponding actual patterns as entries, is created and initialized. When the master list of patterns is saved using standard techniques, each pattern generated for a domain and a set of application parameters is given a unique identification (hereafter "pattern ID") to uniquely identify that pattern in that domain. At block 606, a dictionary (hereafter "Dict_M"), with pattern IDs from List PATTERN_IDs as keys and a list of corresponding loci X-values for the pattern as entries, is created and initialized. At block 608, the unknown sample data set (hereafter "Sample_1") is evaluated using Dict_K, Dict_L, Dict_M, and List PATTERN_IDS to generate Dict_N, with pattern IDs as keys and corresponding scores for the patterns as entries, for the patterns within List PATTERN_IDS that match the patterns of Sample_1; this is described in more detail in FIGS. 30-32. At block 610, Score1, Score2, and Score3 for Sample_1 of Subdomain_1 are calculated using Dict_N; this is described in more detail with reference to FIG. 33. At block 612, a decision is made as to whether there are any sub-domains remaining in Domain_1. If YES at block 612, at block 614 the next sub-domain (hereafter "Subdomain_1") for Domain_1 is retrieved, and the method 216 returns to block 602.

If NO at block 612 of FIG. 29, at block 616 Score2 for all the sub-domains of Domain_for Sample_1 are compared. At block 618, it is determined that the sub-domain of Domain_1 for Sample_1 with the highest Score2 value is the sub-domain containing Sample_1. At block 620, a decision is made as to whether there are any samples remaining to be evaluated. If YES at block 620, the method 216 returns to block 600. If NO at block 620, at block 621 the method 216 is complete.

Figure 30:
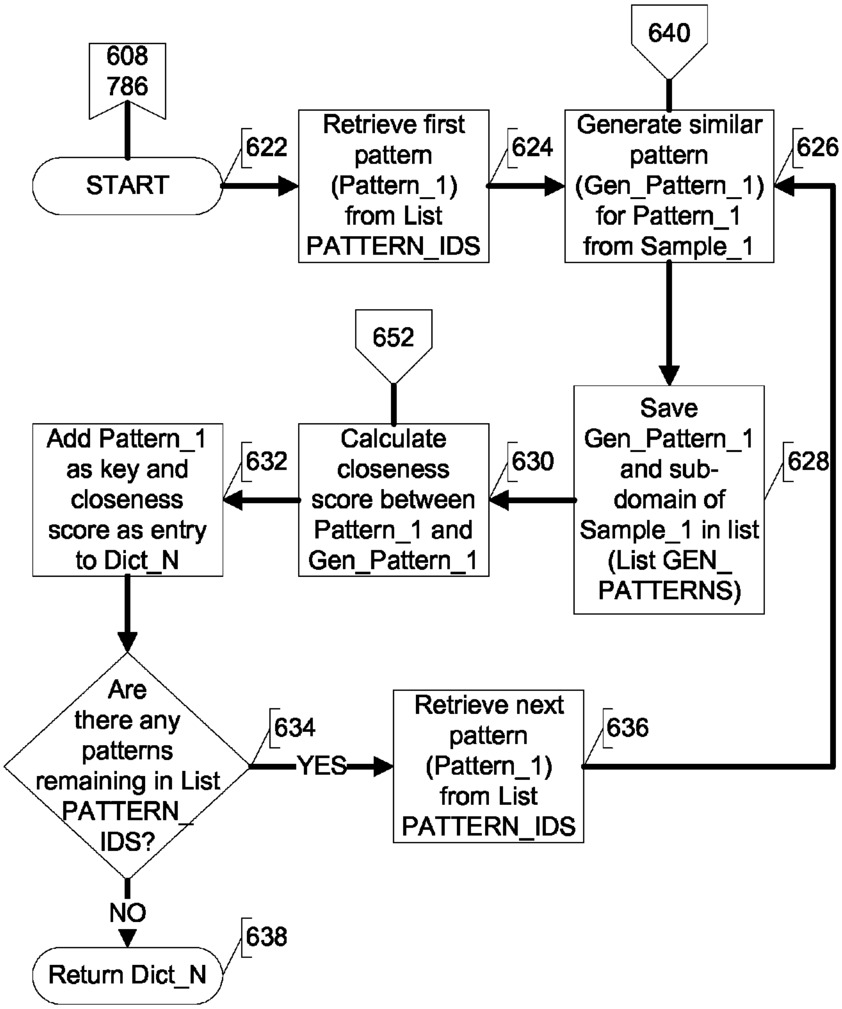
FIG. 30 shows an example method for evaluating an unknown sample data set.

FIG. 30 shows an example method 608, 786 for evaluating a sample data set (i.e., Sample_1). In one embodiment, the sample data set is from the tuning sample data sets, while in an alternate embodiment, it is from the unknown sample data sets. The purpose of the evaluation is to determine the sub-domain of the sample data set based upon the analyzed patterns for that domain. If the sample data set belongs to the tuning sample data sets, then the patterns generated for it are used to tune the original analysis. However, if the sample data set belongs to the unknown sample data sets then the patterns generated are used to determine the sub-domain. Based on a list of unique patterns in the sub-domain, similar patterns are generated, if possible, for each unique pattern from Sample_1. In order to find a similar pattern in Sample_1 for a pattern in the unique pattern list, Sample_1 must have loci X-values that fit within the range of X-values for the unique pattern. A closeness score is calculated between the unique pattern and the similar pattern. This closeness score is stored for later use to calculate an overall closeness score between Sample_1 and the sub-domain in an effort to determine the sub-domain of Sample_1.

The method 608, 786 of FIG. 30 initializes at block 622, and at block 624 the first pattern (hereafter "Pattern_1") from List PATTERN_IDS is retrieved. At block 626, a similar pattern (hereafter "Gen_Pattern_1") to Pattern_1 is generated from Sample_1; this is described in more detail in FIG. 31. At block 628, Gen_Pattern_1 and the sub-domain of Sample_1 is saved in a list (hereafter "List GEN_PATTERNS"). At block 630, the closeness score between Pattern_1 and Gen_Pattern_1 is calculated; this is described in more detail in FIG. 32. At block 632, Pattern_1 is added as the key and the previously calculated closeness score is added as the corresponding entry to Dict_N. At block 634, a decision is made as to whether there are any patterns remaining in List PATTERN_IDS. If YES at block 634, at block 636 the next pattern (hereafter "Pattern_1") is retrieved from List PATTERN_IDS, and the method 608, 786 returns to block 626. If NO at block 634, at block 638 Dict_N is returned, and the method 608, 786 is complete.

Figure 31:
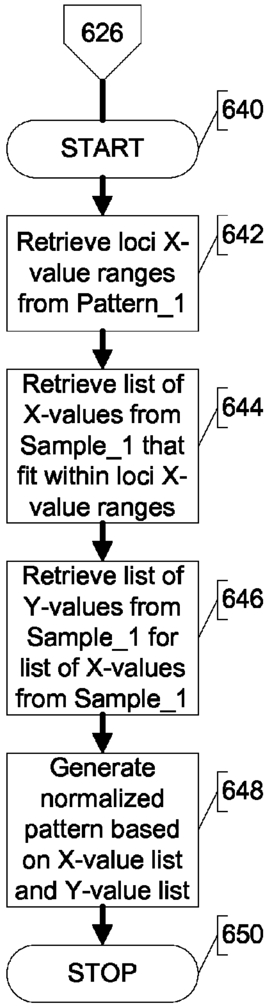
FIG. 31 shows an example method for generating a similar pattern for Pattern_1 from Sample1.

FIG. 31 shows an example method 626 for generating a similar pattern (i.e., Gen_Pattern_1) for Pattern_1 from Sample_1. For Sample_1 to have a similar pattern to Pattern_1, Sample_1 must have loci X-values that fit within the X-value ranges of Pattern_1. If so, then based upon the pattern type, a normalized pattern is generated for Sample_1 based upon the loci Y-values at those X-values. The method 626 initializes at block 640, and at block 642 the loci X-value ranges are retrieved from Pattern_1. At block 644, the list of X-values from Sample_1 that fit within the loci X-value ranges are retrieved. At block 646, the list of Y-values from Sample_1 that corresponds to the list of X-values from Sample_1 is retrieved. At block 648, a normalized pattern is generated based upon the X-value list and the Y-value list. The generation of normalized patterns is described in more detail at FIGS. 7, 8, 10, 11, 23, and 24. At block 650, the method 626 is complete.

Figure 32:
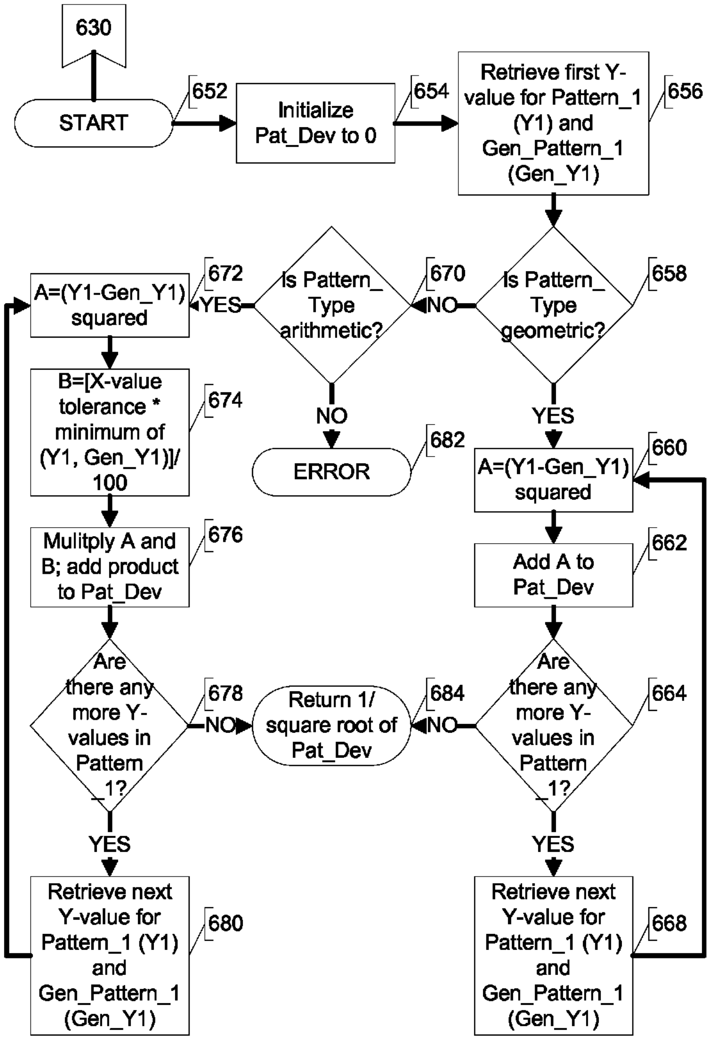
FIG. 32 shows an example method for calculating the closeness score between Pattern_1 and its corresponding similar pattern.

FIG. 32 shows an example method 630 for calculating the closeness score between Pattern_1 and Gen_Pattern_1. Here, the closeness score determines how close the loci Y-values are between the two similar patterns. A pattern deviation is calculated between the two patterns, and the inverse of the pattern deviation is defined as the closeness between two patterns. The method 630 initializes at block 652, and at block 654 the pattern deviation score (hereafter "Pat_Dev") is initialized to zero. At block 656, the first locus Y-value for Pattern_1 and Gen_Pattern_1 (hereafter "Y1" and "Gen_Y1," respectively) are retrieved. At block 658, a decision is made as to whether the Pattern_Type (as determined at block 266 of FIG. 6) is set to geometric. If YES at block 658, at block 660 "A" is calculated to be the difference squared between Y1 and Gen_Y1. At block 662, "A" is added to Pat_Dev. At block 664, a decision is made as to whether there are any locus Y-values remaining in Pattern_1. If YES at block 664, at block 668 the next locus Y-value for Pattern_1 and Gen_Pattern_1 (hereafter "Y1" and "Gen_Y1," respectively) are retrieved, and the method 630 returns to block 660. If NO at block 664, the method 630 proceeds to block 684.

If NO at block 658 of FIG. 32, at block 670 a decision is made as to whether the Pattern_Type (as determined at block 266 of FIG. 6) is set to arithmetic. If YES at block 670, at block 672 Label "A" is calculated to be the difference squared between Y1 and Gen_Y1. At block 674, Label "B" is calculated to be the product of the locus X-value tolerance and Y1 or Gen_Y1, whichever is less. This product is then divided by 100. At block 676, "A" is multiplied by "B," and this product is added to Pat_Dev. At block 678, a decision is made as to whether there are any locus Y-values remaining in Pattern_1. If YES at block 678, at block 680 the next locus Y-value for Pattern_1 and Gen_Pattern_1 (hereafter "Y1" and "Gen_Y1," respectively) are retrieved, and the method 630 returns to block 672. If NO at block 678, the method 630 proceeds to block 684.

If NO at block 670 of FIG. 32, at block 682 an ERROR is returned, and the method 630 is complete.

At block 684 of FIG. 32, the inverse of the square root of Pat_Dev is returned, and the method 630 is complete.

Figure 33:
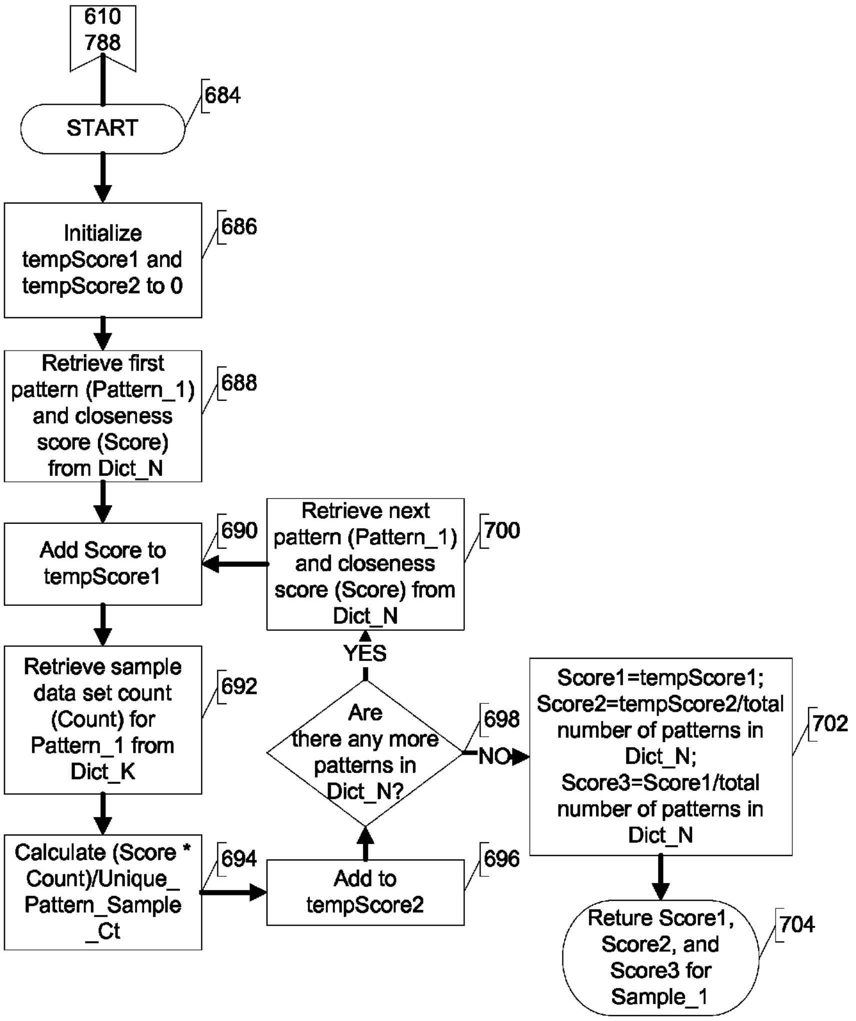
FIG. 33 shows an example method for calculating the closeness scores for Sample_1 for Subdomain_1 using Dict_N.

FIG. 33 shows an example method 610, 788 for calculating the closeness scores for Sample_1 for Subdomain_1 using Dict_N, which as described previously is a dictionary of similar patterns from Sample_1 and the patterns' closeness scores to a given sub-domain. These closeness scores are used cumulatively to calculate three overall closeness scores for Sample_1 for Subdomain1. The method 610, initializes at block 684, and at block 686 tempScore1 and tempScore2, which are temporary closeness scores used to calculate the final three overall closeness scores, are initialized to zero. At block 688, the first pattern (hereafter "Pattern_1"), as well as its associated closeness score (hereafter "Score"), is retrieved from Dict_N. At block 690, Score is added to tempScore1. At block 692, the sample data set count (hereafter "Count") for Pattern_1 is retrieved from Dict_K (see FIG. 29). At block 694, the product of Score and Count is divided by the Unique_Pattern_Sample_Count (see block 596 of FIG. 29). At block 696, the quotient from block 694 is added to tempScore2. At block 698, a decision is made as to whether there are any patterns remaining in Dict_N. If YES at block 698, at block 700 the next pattern (i.e., Pattern_1), as well as the associated closeness score (i.e., Score), is retrieved from Dict_N. The method 610, 788 then returns to block 690. If NO at block 698, at block 702 Score1 is calculated to be equal to tempScore1; Score2 is calculated to be the quotient of tempScore2 and the total number of patterns in Dict_N; and Score3 is calculated to be quotient of Score1 and the total number of patterns in Dict_N. At block 704, Score1, Score2, and Score3 for Sample_1 are returned, and the method 610, 788 is complete.

Figure 34:
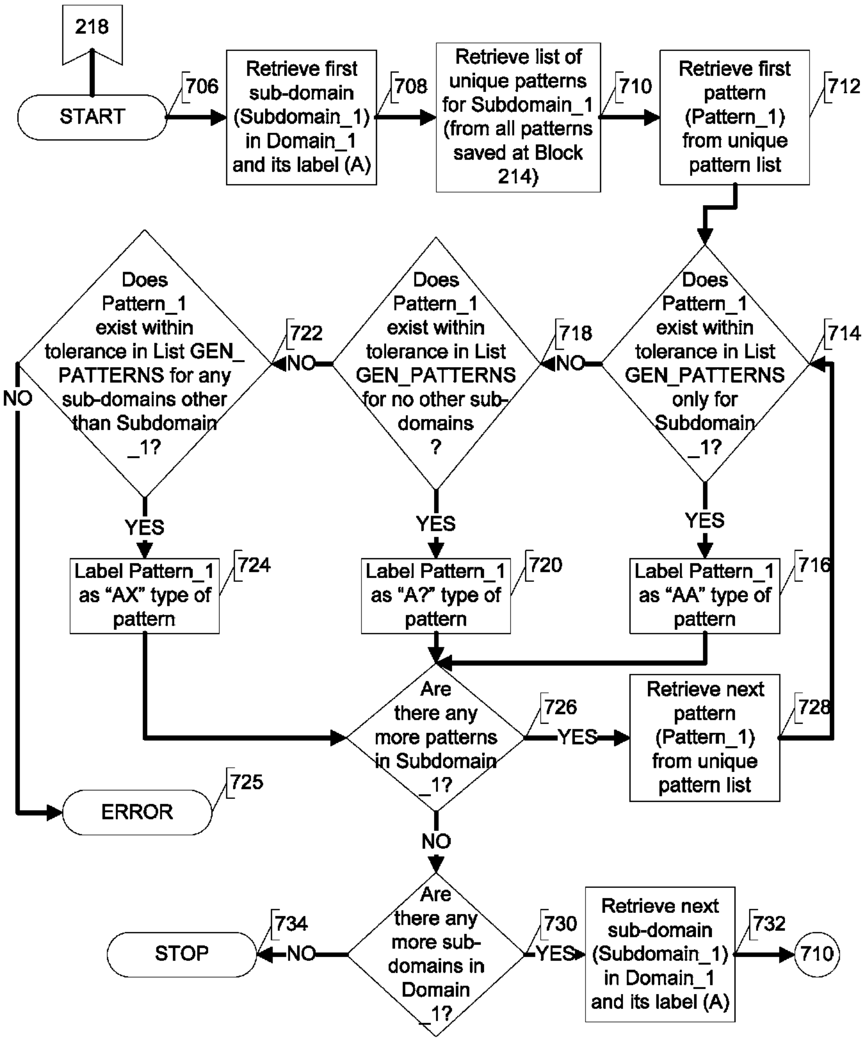
FIG. 34 shows an example method for labeling saved results (i.e., the master list of patterns).

FIG. 34 shows an example method 218 for labeling saved results from the analysis. The patterns are labeled per the following: patterns that identify the correct sub-domain in the tuning sample data sets (hereafter "'AA' patterns"); patterns that do not identify any sub-domains in the tuning sample data sets (hereafter "'A?' patterns"); and patterns that identify the wrong sub-domain in the tuning sample data sets (hereafter "'AX' patterns"). The "AA" and "A?" pattern types are the correct or "good" patterns that are considered for the final evaluation, while the "AX" pattern type is the "bad" pattern that will not be considered for the final evaluation of unknown samples.

The method 218 of FIG. 34 initializes at block 706, and at block 708 the first sub-domain (hereafter "Subdomain_1") in Domain_1, as well as the associated label (hereafter "A"), is retrieved. At block 710, a list of all the unique patterns for Subdomain_1 is retrieved. This list of unique patterns is sourced from the list of patterns saved at block 214 of FIG. 3. At block 712, the first pattern (hereafter "Pattern_1") from the unique pattern list is retrieved. At block 714, a decision is made as to whether Pattern_1 exists within the tolerance of List GEN_PATTERNS (see FIG. 30) for only Subdomain_1. If YES at block 714, at block 716 Pattern_1 is labeled as an "AA" type of pattern, and the method 218 proceeds to block 726. If NO at block 714, at block 718 a decision is made as to whether Pattern_1 exists within the tolerance of List GEN_PATTERNS for no other sub-domains. Note that two patterns are within tolerance if they have the same list of loci X-values and the Y-values are within tolerance as specified by the application parameters; this is described in more detail in FIG. 25 where Epsilon is the tolerance. If YES at block 718, at block 720 Pattern_1 is labeled as an "A?" type of pattern, and the method 218 proceeds to block 726. If NO at block 718, at block 722 a decision is made as to whether Pattern_1 exists within the tolerance of List GEN_PATTERNS for any other sub-domains. If YES at block 722, at block 724 Pattern_1 is labeled as an "AX" type of pattern, and the method 218 proceeds to block 726. If NO at block 722, at block 725 an ERROR is returned, and the method 218 is complete.

At block 726 of FIG. 34, a decision is made as to whether there are any more patterns remaining in Subdomain_1. If YES at block 726, at block 728 the next pattern (hereafter "Pattern_1") from the unique pattern list. The method 218 then returns to block 714. If NO at block 726, at block 730 a decision is made as to whether there are any sub-domains remaining in Domain_1. If YES at block 730, at block 732 the next sub-domain (hereafter "Subdomain_1"), as well as its associated label (hereafter "A"), is retrieved, and the method 218 returns to block 710. If NO at block 730, at block 734 all patterns are labeled, and the method 218 is complete.

Figure 35:
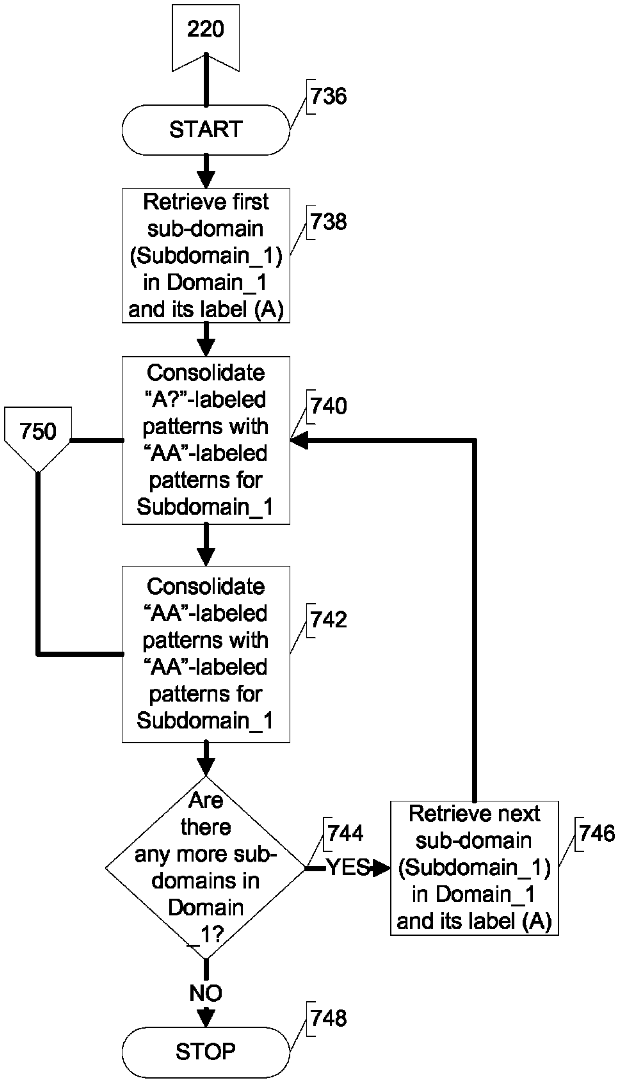
FIG. 35 shows an example method for consolidating the saved and labeled results.

FIG. 35 shows an example method 220 for consolidating the saved and labeled results in an effort to consolidate the "good" patterns and increase their location distribution across sample data sets. Note that patterns found at a greater number of locations are given higher closeness scores when matched with a pattern in the evaluating sample data set as said patterns are considered more important than those occurring at a fewer number of locations as reflected by Score2 as calculated in FIG. 33. The method 220 initializes at block 736, and at block 738 the first sub-domain (hereafter "Subdomain_1") in Domain_1, as well as its associated label (hereafter "A"), is retrieved. At block 740, the "A?" labeled patterns are consolidated with the "AA" labeled patterns for Subdomain_1. At block 742, the "AA" labeled patterns are consolidated with the "AA" labeled patterns for Subdomain_1. For the purpose of this discussion, the "AA" and the "A?" patterns are the "good" patterns that identify only the correct sub-domain(s) or no sub-domains in the tuning sample data sets. In other words, the "AA" and "A?" patterns do not identify the wrong sub-domains as the "AX" patterns do. In this embodiment, the "good" patterns are consolidated in order to improve location distribution. Blocks 740 and 742 are described in more detail in FIG. 36.

At block 744 of FIG. 35, a decision is made as to whether there are any sub-domains remaining in Domain_1. If YES at block 744, at block 746 the next sub-domain (hereafter "Subdomain_1") in Domain_1, as well as its associated label (hereafter "A"), is retrieved, and the method 220 returns to block 740. If NO at block 744, at block 748 the method 220 is complete.

Figure 36:
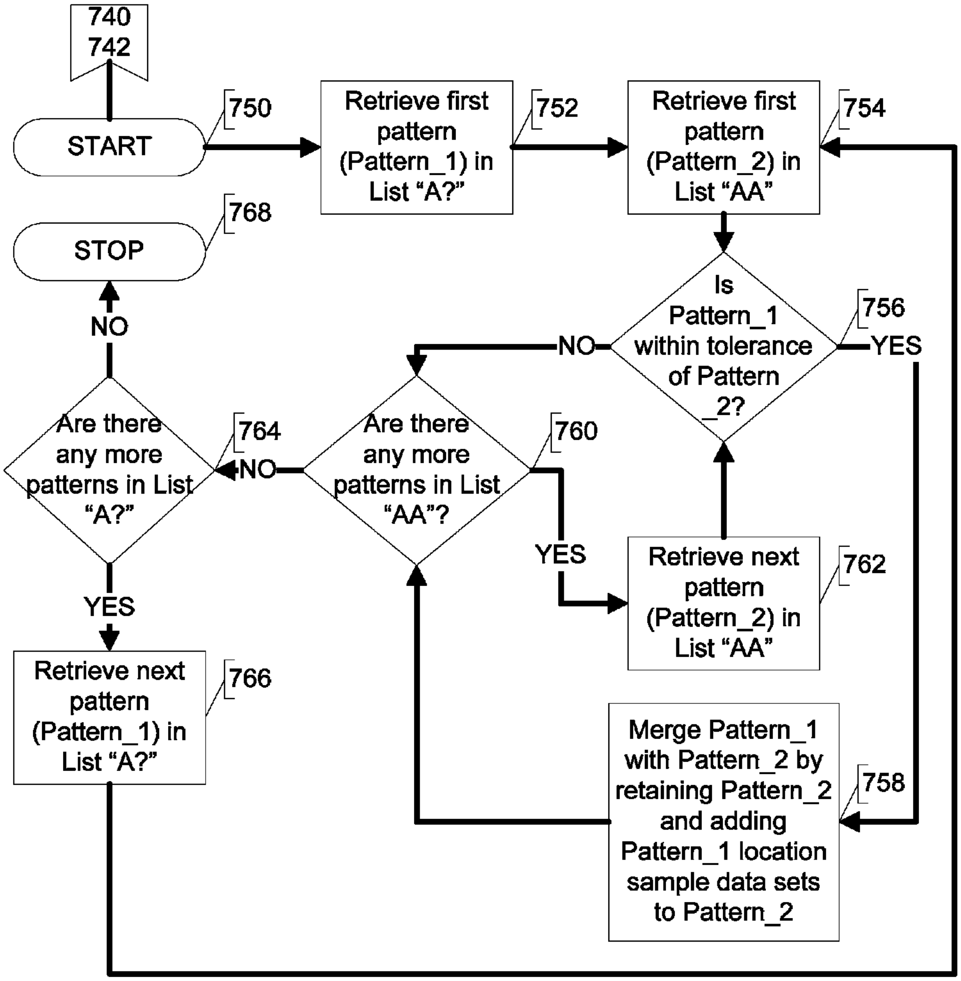
FIG. 36 shows an example method for consolidating the "A?"-labeled patterns and the "AA" labeled patterns with the "AA" labeled patterns for Subdomain_1.

FIG. 36 shows an example method 740, 742 for consolidating the "A?" labeled patterns with the "AA" labeled patterns for Subdomain_1. As previously described, the "AA" patterns are considered to be "good" patterns as they uniquely identify a sub-domain, and the "A?" patterns are considered to be "good" patterns as they do not wrongly identify a sub-domain. These patterns are further consolidated to improve the pattern location distribution. The "AX" patterns are not consolidated as they wrongly identify a sub-domain; accordingly, the "AX" patterns are not considered for final evaluation. The aforementioned process is then repeated to consolidate the "AA" patterns with the "AA" patterns.

The method 740, 742 of FIG. 36 initializes at block 750, and at block 752 the first pattern (hereafter "Pattern_1") in List "A?" is retrieved. At block 754, the first pattern (hereafter "Pattern_2") in List "AA" is retrieved. At block 756, a decision is made as to whether Pattern_1 is within the tolerance of Pattern_2. One pattern is within the tolerance of another if the patterns each have the same list of loci X-values and the associated loci Y-values are within the tolerance as specified by the application parameters; this is described in more detail in FIG. 25 where Epsilon is the tolerance. If YES at block 756, at block 758 Pattern_1 is merged with Pattern_2 by retaining Pattern_2 and adding the Pattern_1 location sample data sets to Pattern_2. The method 740, 742 then proceeds to block 760. If NO at block 756, at block 760 a decision is made as to whether there are any patterns remaining in List "AA." If YES at block 760, at block 762 the next pattern (hereafter "Pattern_2") in List "AA" is retrieved, and the method 740, 742 returns to block 756. If NO at block 760, at block 764 a decision is made as to whether there are any patterns remaining in List "A?" If YES at block 764, at block 766 the next pattern (hereafter "Pattern_1") in List "A?" is retrieved, and the method 740, 742 returns to block 754. If NO at block 764, at block 768 the method 740, 742 is complete.

Figure 37:
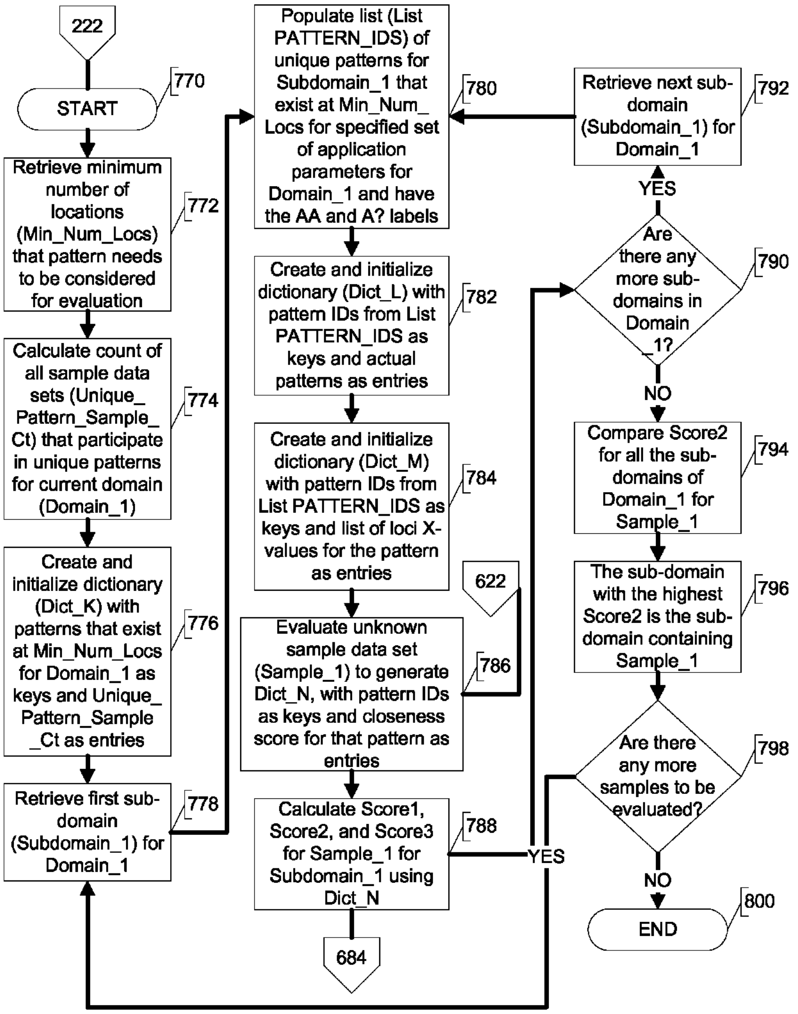
FIG. 37 shows an example method for evaluating the tuning sample data sets for Domain_1.

FIG. 37 shows an example method 222 for evaluating the unknown sample data sets for Domain_1. Here, method 222 is the same as method 216 of FIG. 29 for evaluating the tuning sample data sets except only the "AA" and the "A?" pattern types are considered rather than all unique patterns for a sub-domain. The method 222 initializes at block 770, and at block 772 in one embodiment the minimum number of locations (hereafter "Min_Num_Locs") that the pattern needs to be considered for evaluation is retrieved. At block 774, the count of all sample data sets (hereafter "Unique_Pattern_Sample_Ct") that participate in the unique patterns for the current domain (i.e., Domain_1) is calculated. At block 776, a dictionary (hereafter "Dict_K"), with patterns that exist at Min_Num_Locs for Domain_1 as keys and Unique_Pattern_Sample_Ct as entries, is created and initialized. At block 778, the first sub-domain (hereafter "Subdomain_1") for Domain_1 is retrieved. At block 780, a list (hereafter "List PATTERN_IDS") of unique patterns for Subdomain_1 that exist at Min_Num_Locs for the specified set of application parameters (as determined in FIG. 6) for Domain_1 and have the "AA" and "A?" labels is populated. At block 782, a dictionary (hereafter "Dict_L"), with pattern IDs from List PATTERN_IDS as keys and corresponding actual patterns as entries, is created and initialized. At block 784, a dictionary (hereafter "Dict_M"), with pattern IDs from List PATTERN_IDs as keys and a list of corresponding loci X-values for the pattern as entries, is created and initialized. At block 786, the unknown sample data set (hereafter "Sample_1") is evaluated using Dict_K, Dict_L, Dict_M, and List PATTERN_IDS to generate Dict_N, with pattern IDs as keys and corresponding scores for the patterns as entries, for the patterns within List PATTERN_IDS that match the patterns of Sample_1; this is described in more detail in FIGS. 30-32. At block 788, Score1, Score2, and Score3 for Sample_1 of Subdomain_1 are calculated using Dict_N; this is described in more detail with reference to FIG. 33. At block 790, a decision is made as to whether there are any sub-domains remaining in Domain_1. If YES at block 790, at block 792 the next subdomain (hereafter "Subdomain_1") for Domain_1 is retrieved, and the method 222 returns to block 780.

If NO at block 790 of FIG. 37, at block 794 Score2 for all the sub-domains of Domain_1 for Sample_1 are compared. At block 796, it is determined that the sub-domain of Domain_1 for Sample_1 with the highest Score2 value is the sub-domain containing Sample_1. At block 798, a decision is made as to whether there are any samples remaining to be evaluated. If YES at block 798, the method 222 returns to block 778. If NO at block 798, at block 800 the method 222 is complete.

For illustrative purposes, the analysis of multi-sample, two-dimensional data for the purpose of identifying patterns between and among pluralities of data sets of the same data type is described in detail in the example that follows.

Consider the problem domain "Cancer" containing two different types of cancer: Cancer1 and Cancer2. The sample data sets are two-dimensional with loci X-values representing m/z and the corresponding loci Y-values representing the intensities at the given m/z values. The sample data sets are subdivided into two parts with 75% to be used for the training of patterns and 25% to be used for tuning the training results. The training data is then analyzed, and the patterns are identified using an embodiment of the present invention. Both arithmetic and geometric patterns are identified based upon the specified application parameters, which can include, inter alia, m/z tolerance and intensity tolerance. A pattern is either unique to a specific cancer type or is common between the two different types. A list of unique patterns is generated for each sub-domain.

Based upon the list of unique patterns for each sub-domain, each sample data set in the tuning samples is evaluated to see if a similar pattern exists, and if found, the identified pattern is added to a list of patterns for the sub-domain. A combined list of all generated patterns for all tuning samples is then created.

For each pattern in the unique pattern list for Cancer1 and Cancer2 from training, a determination is made as to whether patterns are identified in the tuning samples only in the matching sub-domain (i.e., "AA" pattern type), in both the Cancer1 and Cancer2 sub-domains (i.e., "AX" pattern type), or in none of the sub-domains (i.e., "A?" pattern type) within a specified tolerance. The patterns are then labeled the appropriate labels.

Next, an unknown sample is evaluated in order to determine its sub-domain. Only the "AA" and "A?" unique patterns are considered during this final evaluation, As in the case of the tuning sample data set, a list of similar patterns for each sub-domain is generated for the unknown sample data set. A cumulative closeness score is calculated for each sub-domain from the list based upon how close the generated similar patterns are to the actual patterns. Thus, the unknown sample has two calculated closeness scores: one for Cancer 1 and one for Cancer2. The higher closeness score is the sub-domain in which the unknown sample is determined to be.

While the preferred embodiment of the present invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. A system for use in analysis of two-dimensional data, the system comprising:

a computer having a processor, a display, and a memory, the processor being configured to operate programming instructions stored in the memory to:

access a first set of two-dimensional data, the first set comprising a plurality of data points each representing a series of points having a locus X-value and a corresponding locus Y-value; and analyze the first set of two dimensional data to determine the presence of a first data set pattern at a determined locus X-value by developing a list of loci X-values and corresponding loci Y-values, the loci X-values being confined to a determined range including the locus X-value, the list further comprising data points drawn from the first set and excluding data points from the first set for which the Y-value is less than a determined tolerance value, the list further including only those data points for which a common mathematical relationship is found to be present.

2. The system of claim 1, wherein the first data set pattern comprises a plurality of first data set patterns.

3. The system of claim 2, wherein first set of data is drawn from a first known source and the programming instructions further cause the processor to associate the plurality of first data set patterns with the first known source.

4. The system of claim 3, wherein the programming instructions further cause the processor to:

access a second set of two-dimensional data drawn from a second known source, the second set comprising a plurality of data points each representing a respective locus X-value having a corresponding locus Y-value; and analyze the second set of two dimensional data to determine the presence of a plurality of second data set pattern at a determined locus X-value by developing a list of loci X-values and corresponding loci Y-values, the loci X-values being confined to a determined range including the locus X-value, the list further comprising data points drawn from the second set and excluding data points from the second set for which the Y-value is less than a determined tolerance value, the list further including only those data points for which a common mathematical relationship is found to be present; and associate the plurality of second data set patterns with the second known source.

5. The system of claim 4, wherein the programming instructions further cause the processor to compare the plurality of first data set patterns with the plurality of second data set patterns, and to remove any common patterns such that the each of the associated plurality of first data set patterns is different from the associated plurality of second data set patterns.

6. The system of claim 5, wherein the programming instructions further cause the processor to:

access a third set of two-dimensional data, the third set comprising a plurality of data points each representing a respective locus X-value having a corresponding locus Y-value; and analyze the third set of two dimensional data to determine the presence of one or more third data set patterns at a determined locus X-value;

compare the one or more third data set patterns with the associated first data set patterns to produce a first source score;

compare the one or more third data set patterns with the associated second data set patterns to produce a second source score; and assign the third set of data to either the first source or the second source based on a comparison of the first source score and the second source score.

* * * * *